United States Patent

[11] 3,603,745

[72] Inventor Henry Mann
Holmdel, N.J.
[21] Appl. No. 879,282
[22] Filed Nov. 24, 1969
[45] Patented Sept. 7, 1971
[73] Assignee Bell Telephone Laboratories, Incorporated
Murray Hill, N.J.

[54] MEASUREMENT OF AVERAGE DUTY CYCLE

16 Claims, 45 Drawing Figs.

[52] U.S. Cl. .......... 179/175.2 A, 178/69 A, 324/140 D
[51] Int. Cl. .......... H04m 3/08
[50] Field of Search .......... 179/175.2 A, 175.2 R; 178/69 A; 324/140 D

[56] References Cited

UNITED STATES PATENTS

| | | | |
|---|---|---|---|
| 3,243,526 | 3/1966 | La Barge et al. .......... | 179/175.2 A |
| 3,410,967 | 11/1968 | Boring .......... | 179/175.2 A |

*Primary Examiner*—Kathleen H. Claffy
*Assistant Examiner*—Douglas W. Olms
*Attorneys*—R. J. Guenther and James Warren Falk ABSTRACT: Digital technique is used to control two clock pulse counters and a shift register for measuring an approximation of the average percent break or pulsing speed over a series of telephone dial pulse periods. For percent break, up-counter B serially counts pips of frequency 100*f* during the sum of nine break intervals and the nine's complement (one's complement in the binary form) is placed in reentrant up-counter A. The shift register accumulates pips of frequency *f* during the entire time of nine pulse periods. Dividing circuitry causes the shift register count to recirculate while being serially added to the count in A. Recirculation is stopped when A exceeds its capacity (from capacity to zero count). The number of recirculations is registered as a percent. Fractional control circuitry takes into account any remainder in the shift register. Visual display is provided of the answer in percent. For pulsing speed, a prescribed count is placed in up-counter A and the accumulated shift register count corresponding to the nine pulse periods is used as in percent break to provide an answer approximating the pulsing speed.

INVENTOR
H. MANN
BY [signature]
ATTORNEY

DELAYED SINGLE SHOT

DELAYED SINGLE SHOT

DELAYED SINGLE SHOT

MONOSTABLE MULTIVIBRATOR

DISPLAY TIMER

JK FLIP FLOP

JK FLIP FLOP

JK FLIP FLOP

JK FLIP FLOP

JK FLIP FLOP

JK FLIP FLOP

JK FLIP FLOP

8421 BINARY CODED DECIMAL COUNTER

8-BIT SHIFT REGISTER

8-BIT SHIFT REGISTER

128-BIT SHIFT REGISTER

128-BIT SHIFT REGISTER

MEASUREMENT OF AVERAGE DUTY CYCLE

BACKGROUND OF THE INVENTION

The general field of the present invention is the art of electrical signal measurement and particularly the measurement of the duty cycle of signals occurring among others in a series. Specifically, the present invention enables measurement of the average time interval between alternate consecutive pairs of signals among an odd series of such signals in terms of a percentage of the average time period between consecutive odd signals. The particularly pertinent field of the invention is in the area of measuring average percent break over a series of telephone dial pulses or the like.

The prior art, such as U.S. Pats. No. 1,964,526 to Melsheimer of June 26, 1934, No. 2,428,488 to Ghormley of Oct. 7, 1947, No. 3,123,679 to Donville et al. of Mar. 3, 1964, and No. 3,410,967 to Boring of Nov. 12, 1968, has employed analog methods of measuring percent break where the usual condenser charging or discharging is used to acquire a voltage for comparison (by a meter, for example) with another voltage to ascertain whether the percent break over a series of pulse periods or the percent break of a single pulse period is too high, too low or within prescribed limits. Such prior art, while suitable for its intended purpose, provides means for only qualitative answers in terms of whether the percent break (duty cycle) is above, below, or within some prescribed value or range. The present invention provides an arrangement for producing a quantitative answer for each series of pulse periods tested, where the quantitative answer is determined solely by the series of pulse periods tested.

Other prior art, such as U.S. Pats. No. 2,216,730 to Berger of Oct. 8, 1940 and No. 3,243,526 to La Barge et al. of Mar. 29, 1966, has employed digital technique for measuring some aspects of the duty cycle problem. However, such prior art has required some mental calculations to arrive at the answer. The present invention employs digital technique to derive quantitative answers and requires the use of mental operations only to read the answer from a visual display.

SUMMARY OF THE INVENTION

In broad aspect, the present invention contemplates circuitry for automatically measuring the average time interval between alternate consecutive pairs of signals among an odd series of such signals in terms of a percentage of the average time period between consecutive odd signals by (1) registering an indication of the sum of all time intervals between signals of alternate pairs, (2) registering an indication of the sum of all time periods between the first and last signals, and (3) dividing (1) by (2) to provide a percent.

More particularly, two registers are used to register the two time indications and means is provided for electrically dividing one indication by the other.

More particularly, clock pulse control is provided for controlling two clock pulse counters and the dividing operation so that the measurements and divisions are precisely related to the clock pulse accuracy.

More particularly, one counter is controlled to contain a pulse count at a clock pulse frequency of (10 times $x$)$f$ (where $x$ is an integer) indicative of the sum of all time intervals, another counter is controlled to contain a pulse count at a clock pulse frequency of $f$ indicative of the sum of all time periods, and dividing circuitry is provided to automatically ascertain how many times the $f$ clock count is divisible into the (10 times $x$)$f$ clock count.

Specifically, a counter B serially counts the number of clock pulses occurring at a frequency of 100$f$ during the sum of all time intervals, the B count is transferred as a corresponding count into a counter A, a shift register serially accumulates the number of clock pulses occurring at a frequency of $f$ during the sum of all time periods, the shift register content is recirculated as it is serially subtracted from the count in counter A, and the number of recirculations are counted as are required to dissipate the count in counter A.

More specifically, counter A is a reentrant counter of the same count capacity as counter B, the count transferred to counter A is the nine's complement of the count in counter B, and the recirculated shift register content is serially added into counter A until the latter exceeds its capacity.

BRIEF DESCRIPTION OF THE DRAWING

The drawing consists of FIGS. 1 through 45 arranged on twelve sheets as follows.

DETAILED DESCRIPTION

The detailed description to follow is arranged in four main sections: the Circuit Symbols; the Signals; the Block Diagram; and, the Detailed Circuit Disclosure. These matters will be taken up in the above order under the appropriate headings.

CIRCUIT SYMBOLS

The following, under suitable headings, explain conventions and symbols as used in the detailed circuit layout of FIGS. 40 through 44. In explaining the action of the circuit components, it is assumed that they are connected in the circuit as shown on FIGS. 40 through 44. The diagrams used to show the action of the components are not intended to represent true waveforms, but merely to illustrate the logic level functions performed by the circuit components in the context of FIGS. 40 through 44.

Battery and Ground

A circle with a plus sign ⊕ indicates the positive terminal of a source of direct current supply, the negative terminal of which is assumed to be connected to ground, which is considered as zero potential. The direct current voltage is five volts unless otherwise indicated.

Detached Contacts

A crossmark (X) on a conductor indicates a pair of electrical contacts associated with a switch. The contacts complete the circuit path when the switch is operated and open the circuit when the switch is not operated (released).

High and Low Signals

A potential condition, whether steady or transient, is said to be a high logic level if it is two volts or more positive. A low logic level condition is a voltage not more positive than about one-half of a volt.

NAND Gate

Figure 3:
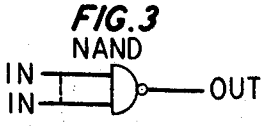

FIG. 3 shows the symbol for a typical NAND gate such as Motorola integrated circuit MC830 and the like.

Figure 4:
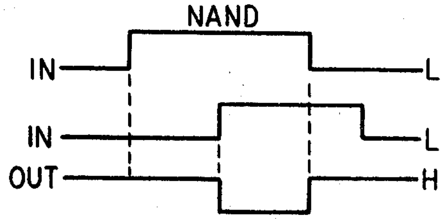

FIG. 4 shows the circuit action of the NAND gate. The output will be low only if all inputs are high: otherwise, the output will be high.

Inverter

Figure 5:
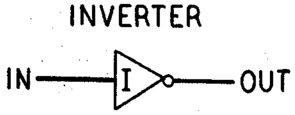

FIG. 5 shows the symbol for a typical inverter such as Motorola integrated circuit MC836 and the like.

Figure 6:
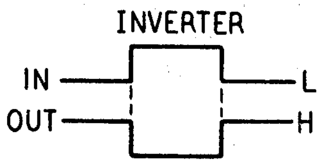

FIG. 6 shows the circuit action of the inverter. The output will be the inverse of the input. That is, a low input produces a high output and a high input produces a low output.

OR Gate

Figure 7:
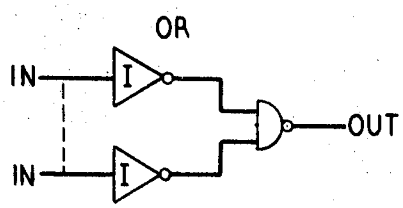

FIG. 7 shows how a NAND gate may be combined with inverters to produce an OR gate.

Figure 8:
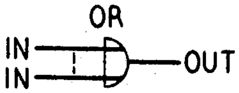

FIG. 8 shows the symbol for an OR gate.

Figure 9:
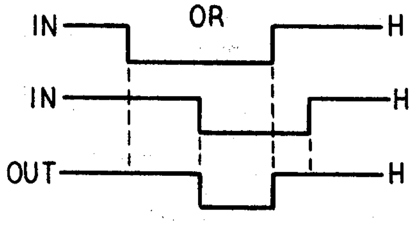

FIG. 9 shows the circuit action of an OR gate. The output will be low only when all inputs are low: otherwise, the output will be high.

AND Gate

Figure 10:
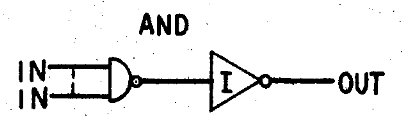

FIG. 10 shows how a NAND gate and an inverter may be combined to produce an AND gate.

Figure 11:
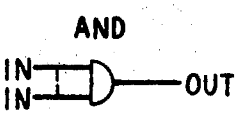

FIG. 11 shows the symbol for an AND gate.

Figure 12:
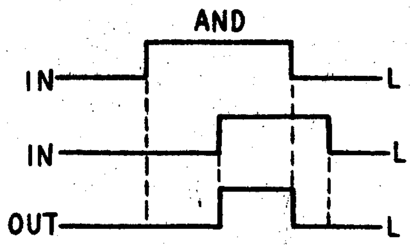

FIG. 12 shows the circuit action of an AND gate. The output will be high only when all inputs are high: otherwise, the output will be low.

Delay

Figure 13:
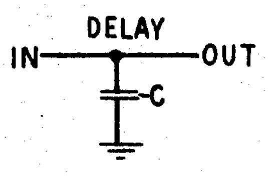

FIG. 13 shows how a capacitor can be connected to a conductor such that a delay is attached to each low-to-high transition. The amount of delay is a function of the value of the capacitor C and the amount and nature of connecting circuits.

Figure 14:
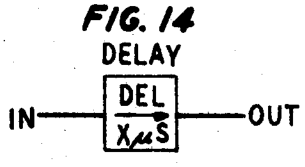

FIG. 14 shows the symbol for a delay circuit with an arrow pointing in the direction of the effect of the delay. The symbol includes the amount of delay (microseconds μsec. or milliseconds msec.) where pertinent.

Figure 15:
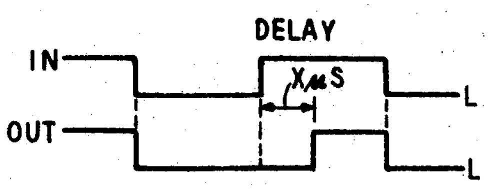

FIG. 15 shows the circuit action of the delay circuit. A low-to-high transition at the input is delayed by $x$ μsec. at the output due to a controllable charging time of capacitor C. No delay to speak of is experienced at the output by a high-to-low transition at the input since the discharge path of capacitor C is arranged to be very fast.

Single-Shot

Figure 16:
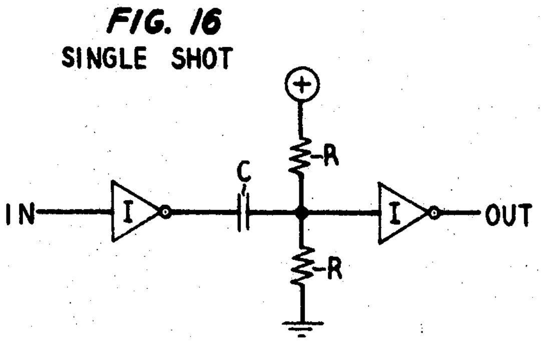

FIG. 16 shows how a single-shot circuit may be made to produce a low-to-high output of a specified short width from a longer low-to-high input.

Figure 17:
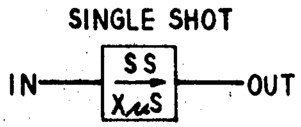

FIG. 17 shows the symbol for a single-shot circuit like FIG. 16.

Figure 18:
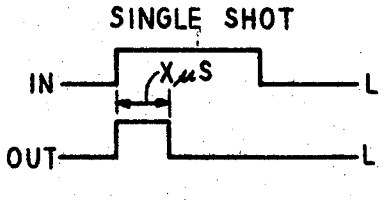

FIG. 18 shows the circuit action of the single-shot. A low-to-high transition at the input will produce at the output a low-to-high transition lasting for $x$ μsec. Normally, the output is low due to the inverter connected between the output and the normally high resistance divider midpoint. Low-to-high transitions at the left terminal of condenser C (same as high-to-low input transition), will have no effect on the output logic level. However, a low-to-high input will produce a high-to-low transition at the left terminal of capacitor C, which will at once cause a high-to-low transition at the divider midpoint, which in turn will produce a low-to-high output. The output will stay high for $x$ μsec. until capacitor C recharges to bring the divider midpoint back to a high condition, whereupon the output goes low again.

Delayed Single-Shot

Figure 19:
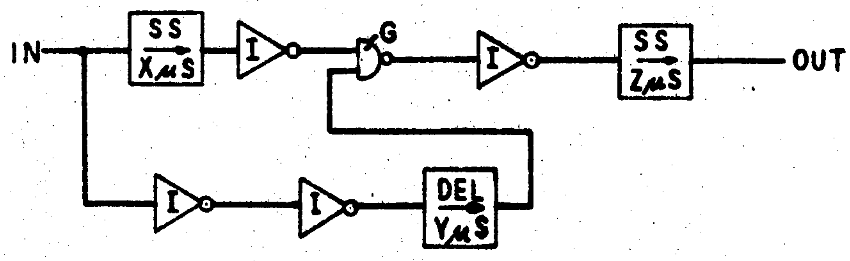

FIG. 19 shows how a delayed single-shot circuit may be made to produce a low-to-high output of a specified short width delayed a specified time from the controlling low-to-high transition of a longer input.

Figure 20:
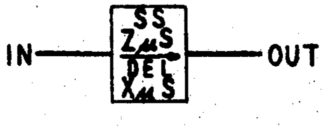

FIG. 20 shows the symbol of a delayed single-shot circuit like FIG. 19.

Figure 21:
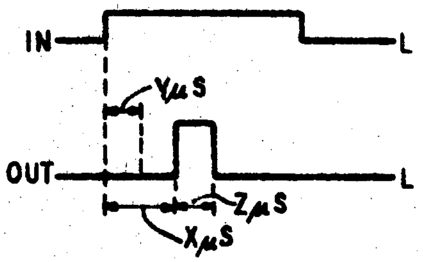

FIG. 21 shows the circuit action of the delayed single-shot. Under steady state conditions, the output is low from the single-shot $z$. No change at the input, except a low-to-high, will affect the logic level of the output. When a low-to-high input occurs, the upper input of gate G goes low for $x$ μsec. and then returns to high and lower input of gate G will stay low for $y$ μsec. and will then go high. As long as either input to gate G is low ($x$ μsec.), the output of gate G will be high. As soon as both inputs of gate G are high (at end of $x$ μsec.), the output of gate G will go low to provide a low-to-high transition at the input of single-shot $z$. The resulting output is a single-shot high of $z$ μsec. delayed $x$ μsec. from the controlling low-to-high input transition.

Display Timer

Figure 22:
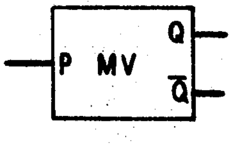

FIG. 22 shows a typical monostable multivibrator which has a stable state where Q is low and $\overline{Q}$ is high and an unstable state where Q is high and $\overline{Q}$ is low. A positive going (low-to-high) pulse on the input P will trigger the multivibrator into its unstable state (Q high and $\overline{Q}$ low). The circuit is arranged, as is well known, so that the multivibrator will revert to its stable state (Q low and $\overline{Q}$ high) after a prescribed time delay, such as a number of milliseconds (msec.).

Figure 23:
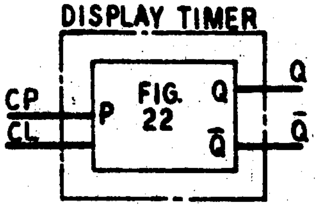
Figure 24:
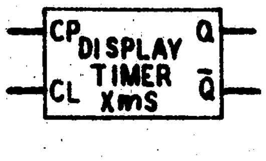

FIG. 23 shows how a multivibrator like FIG. 22 may be arranged with an additional clear input CL to form a display timer, the symbol for which is shown in FIG. 24. A positive (high) potential on input CL will immediately reset the timer to its stable state (Q low and $\overline{Q}$ high) if it is not already in that state.

JK Flip-Flop

Figure 25:
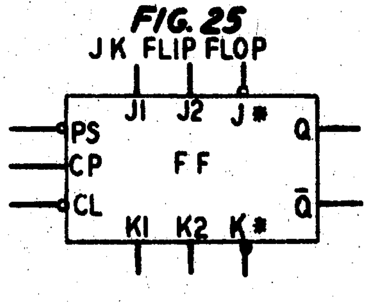
Figure 26:
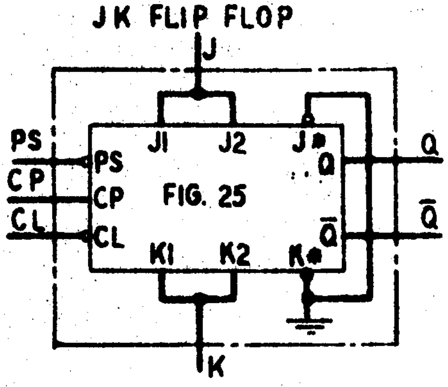
Figure 30:
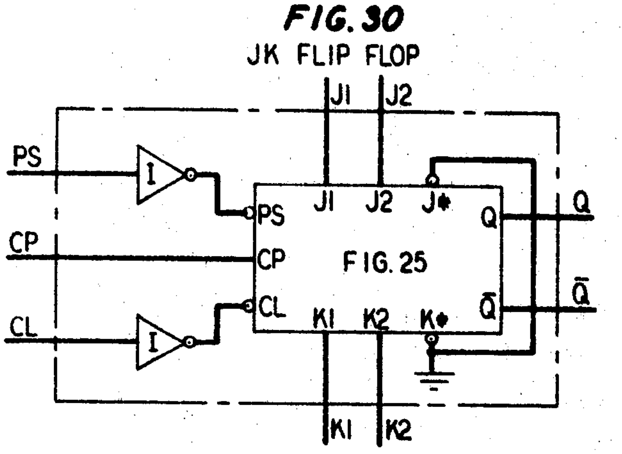

FIG. 25 shows a typical JK flip-flop such as Texas Instruments integrated circuit SN 7470 and the like. PS is preset, CP is clock pulse, CL is clear, Q is the "1" output, $\overline{Q}$ is the "0" output, and J1, J2, K1, K2, J* and K* are the various J and K inputs. Whenever the J* and K* inputs are not used, they are grounded as shown in FIGS. 26 and 30. If only one J or K input is used, the J1 and J2 or K1 and K2 or both are connected together as shown in FIG. 26. The J and K information is changed, if at all, when the CP input is low.

Figure 27:
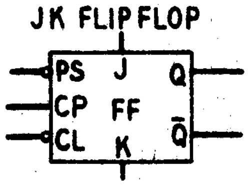

FIG. 27 is the symbol for the circuitry of FIG. 26. Here, when CP is low, a low on PS presets the flip-flop to Q high and $\overline{Q}$ low, and a low on CL clears the flip-flop to Q low and $\overline{Q}$ high. As long as the preset PS or clear CL is low, pulses on the CP input have no effect: the preset PS and clear CL must be high for pulses on the CP input to be effective. With J and K both low, a low-to-high pulse on CP does not affect the state of Q and $\overline{Q}$. When J and K are both high, a low-to-high pulse on CP will toggle the Q and $\overline{Q}$ outputs (change lows to highs and vice versa). With J low and K high, a low-to-high pulse on CP causes Q to be low and $\overline{Q}$ to be high. With J high and K low, a low-to-high pulse on CP causes Q to be high and $\overline{Q}$ to be low. The following table shows this circuit action:

| CP | J | K | Q | $\overline{Q}$ |
|---|---|---|---|---|
| P | L | L | X | X |
| P | H | H | T | T |
| P | L | H | L | H |
| P | H | L | H | L |

L...means low,
H...means high,
X...means no change, and
T...means toggle (high-to-low, etc.).

Figure 28:
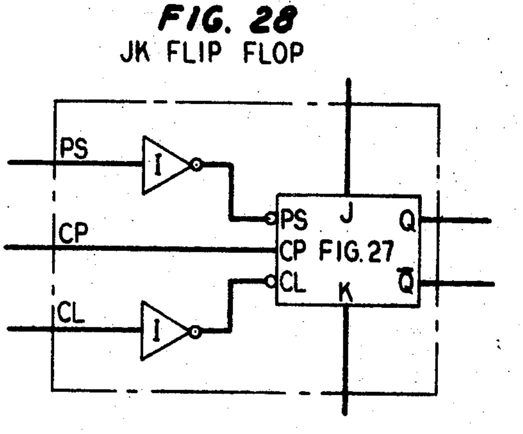
Figure 29:
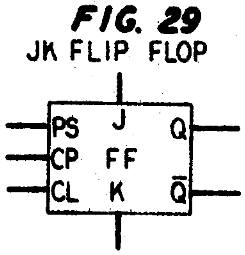

FIG. 28 shows how to modify the flip-flop of FIG. 27 so that the preset PS and clear CL inputs are responsive to highs instead of lows. The symbol for FIG. 28 is shown in FIG. 29.

Figure 31:
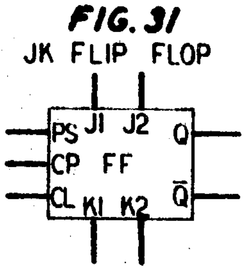

FIG. 30 shows how to modify the flip-flop of FIG. 25 so that the preset PS and clear CL inputs are responsive to highs instead of lows, so that the J* and K* inputs are not used, and so that the J1, J2, K1 and K2 inputs are separately available. The symbol for FIG. 30 is shown in FIG. 31. Here, with CP low, a high on PS sets Q high and $\overline{Q}$ low and a high on CL clears Q to low and $\overline{Q}$ to high. With both J1 and J2 low and both K1 and K2 low, a high on CP does not change the state of Q and $\overline{Q}$. With all of the J and K inputs high, a high on CP toggles the Q and Q outputs. With either J1 or J2 low and both K1 and K2 high, a high on CP sets Q low and Q high. With both J1 and J2 high and K1 or K2 low, a high on CP sets Q high and Q low.

8421 BCD Counter

Figure 32:
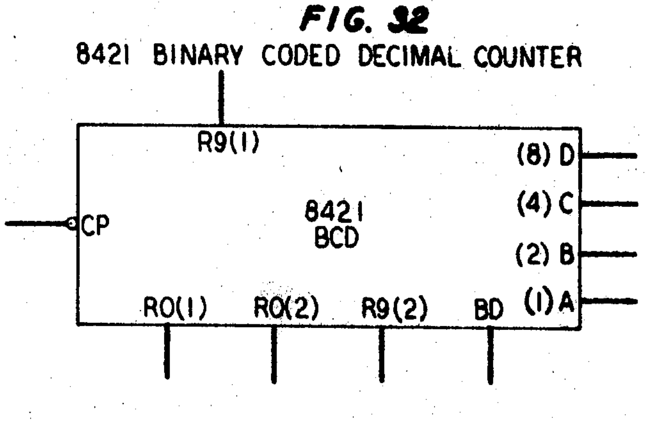

FIG. 32 shows the symbol of a typical decade counter such as Texas Instruments integrated circuit SN 7490 and the like. The binary coded decimal weighings of the output leads A, B, C and D are 1, 2, 4 and 8, respectively. Used as a symmetrical divide-by-10 counter, the D output is connected to the CP input, BD is the input, and A is the output. Used as a binary coded decimal counter, BD is connected to A, and CP is the input.

As a BCD counter, if R0(1) and R0(2) are high and at least one of R9(1) and R9(2) is low, the counter remains in state zero (0000). If R9(1) and R9(2) are high, the counter remains in state nine (1001). If R0(1) or R0(2) is low and R9(1) or R9(2) is low, the following table shows the states of the A, B, C and D outputs as the clock pulse input CP (P) receives high-to-low pulses:

| | 1 | 2 | 4 | 8 | |
|---|---|---|---|---|---|
| CP | A | B | C | D | Decimal count |
| P | L | L | L | L | 0 |
| P | H | L | L | L | 1 |
| P | L | H | L | L | 2 |
| P | H | H | L | L | 3 |
| P | L | L | H | L | 4 |
| P | H | L | H | L | 5 |
| P | L | H | H | L | 6 |
| P | H | H | H | L | 7 |
| P | L | L | L | H | 8 |
| P | H | L | L | H | 9 |
| P | L | L | L | L | 0 |
| | | | etc. | | |

2421 BCD Counter

Figure 33:
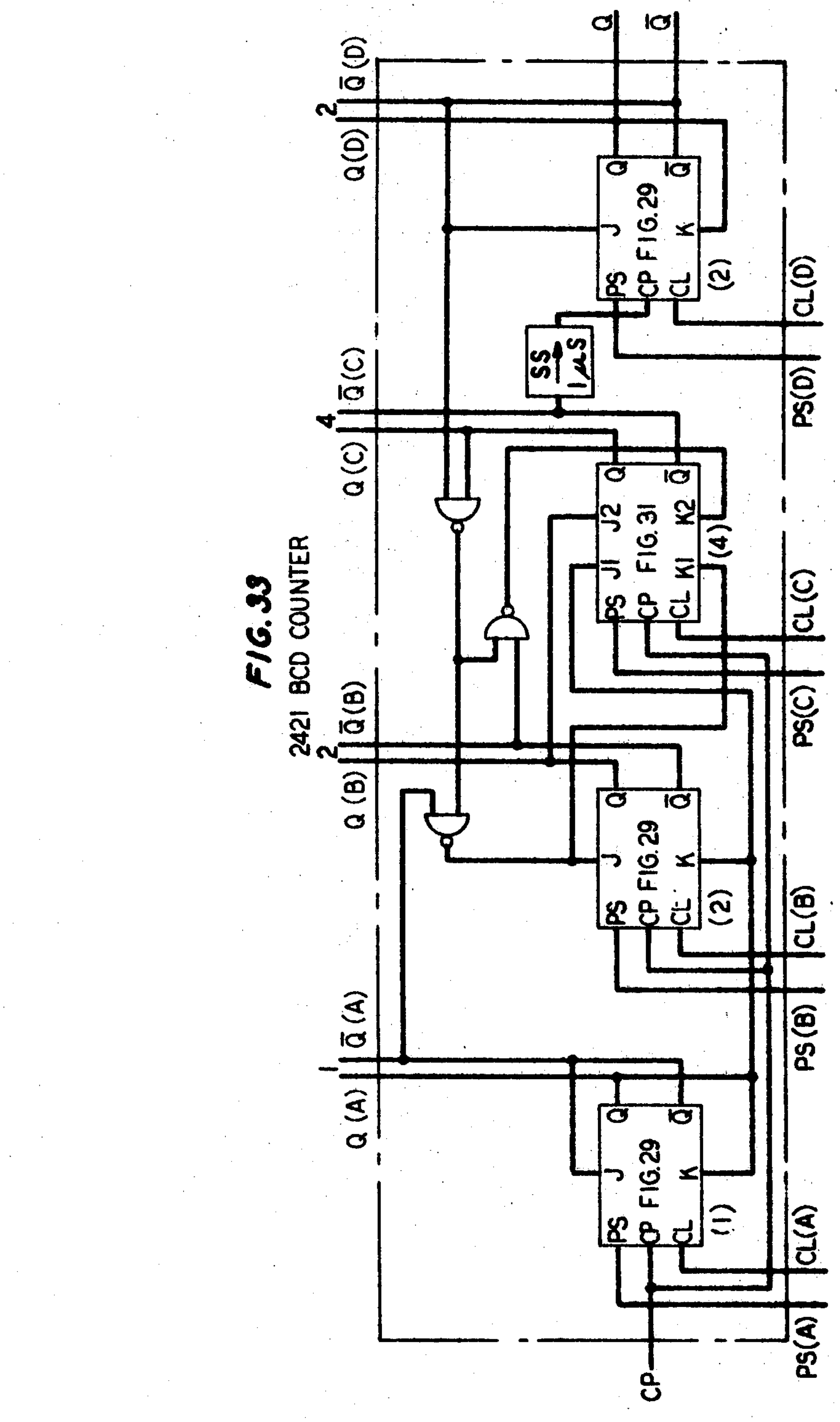

FIG. 33 shows how flip-flops like those of FIGS. 29 and 31 may be connected to produce a 2421 binary coded decimal counter. The 2421 code is a self-complementing decimal coding.

Figure 34:
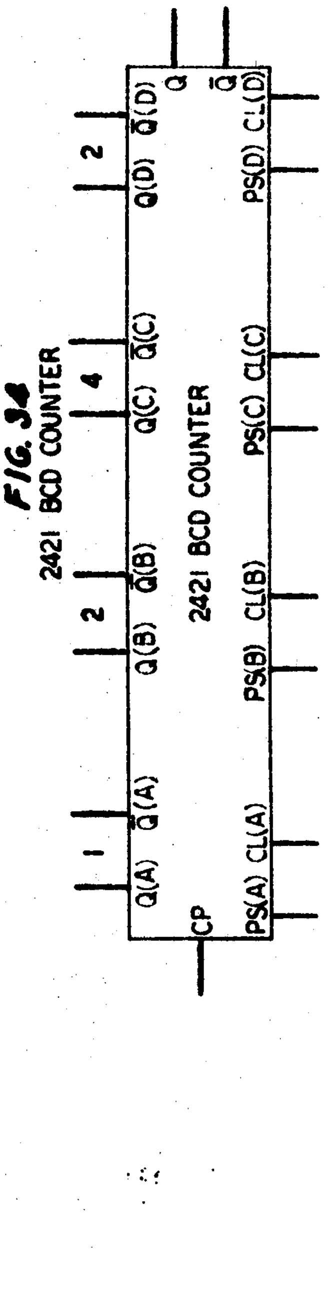

FIG. 34 is the symbol for the circuit of FIG. 33. With the clock pulse input CP low, a high on any preset input PS sets the corresponding stage to Q high and $\bar{Q}$ low and a high on any clear input CL clears the corresponding stage to Q low and $\bar{Q}$ high. The following table shows the action of the circuit set for counting in response to low-to-high pulses (P) on input CP, outputs Q and $\bar{Q}$ being the same as outputs Q (D) and $\bar{Q}$(D).

| | 1 | 2 | 4 | 2 | |
|---|---|---|---|---|---|
| CP | Q(A) | Q(B) | Q(C) | Q(D) | Decimal count |
| P | L | L | L | L | 0 |
| P | H | L | L | L | 1 |
| P | L | H | L | L | 2 |
| P | H | H | L | L | 3 |
| P | L | L | H | L | 4 |
| P | H | L | L | H | 5 |
| P | L | L | H | H | 6 |
| P | H | L | H | H | 7 |
| P | L | H | H | H | 8 |
| P | H | H | H | H | 9 |
| P | L | L | L | L | 0 |
| | | | etc. | | |

Shift Register

Figure 35:
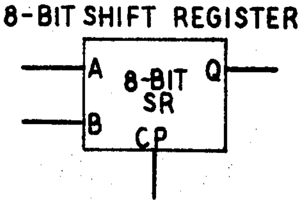

FIG. 35 shows a typical 8-bit shift register such as Texas Instruments integrated circuit SN 7491 and the like. A and B are control inputs, CP is clock pulse input, and Q is the output. With input B high and input A low, a low-to-high pulse on the clock pulse input CP will clear the first cell (set a zero in the first cell). With input B high and input A high, a low-to-high pulse on CP will set the first cell to one. Each clock pulse on CP will shift the contents of each cell to the next cell. Thus, at least eight clock pulses on CP are required to clear the entire shift register.

Figure 36:
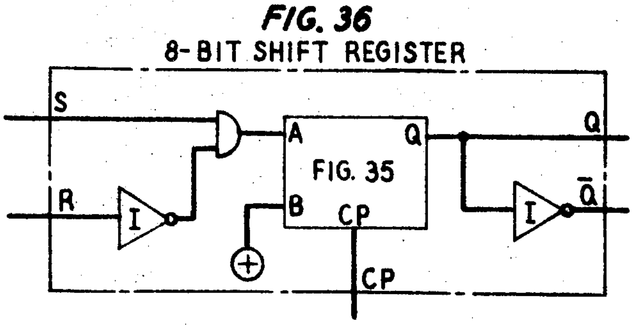

FIG. 36 shows how the shift register of FIG. 35 may be arranged to provide two inputs S and R to control the A input (the B input being made permanently high) and to provide a $\bar{Q}$ output in addition to the Q output. The symbol for this arrangement is shown in FIG. 37.

Figure 37:
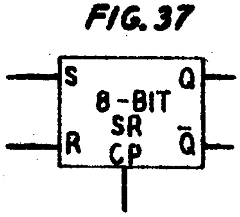
Figure 38:
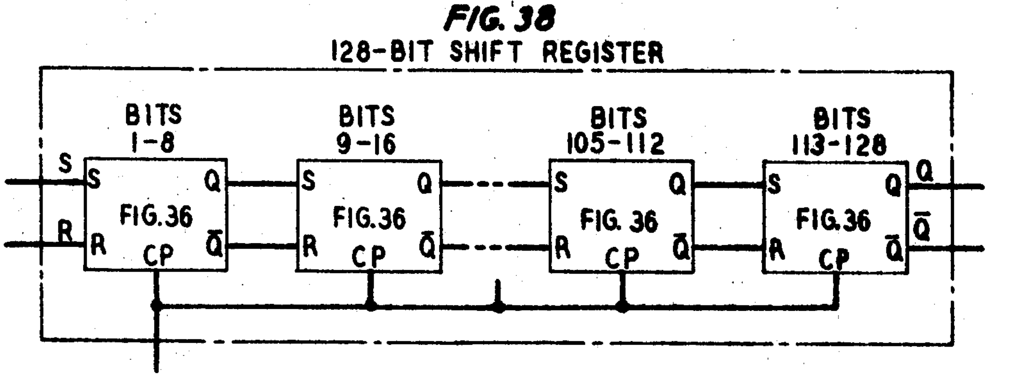
Figure 39:
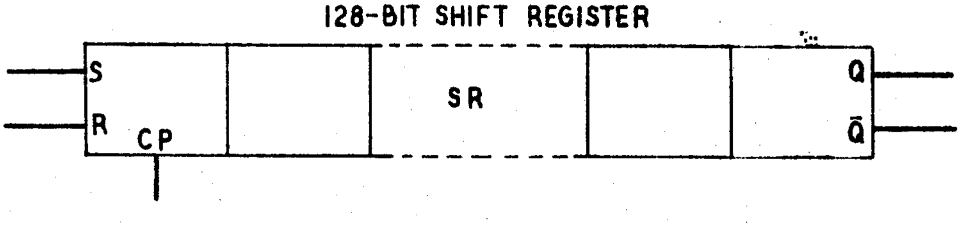

FIG. 38 shows how 16 circuits like FIG. 37 may be arranged in series to provide a 128-bit shift register, the symbol for which is shown in FIG. 39. In FIG. 39, if input S is low or input R is high, a low-to-high pulse on input CP will clear the first cell (set a zero in the first cell) and shift the register contents; and, if S is high and R is low, a low-to-high transition on input CP will set the first cell to one and shift the contents.

SIGNALS

Figure 2:
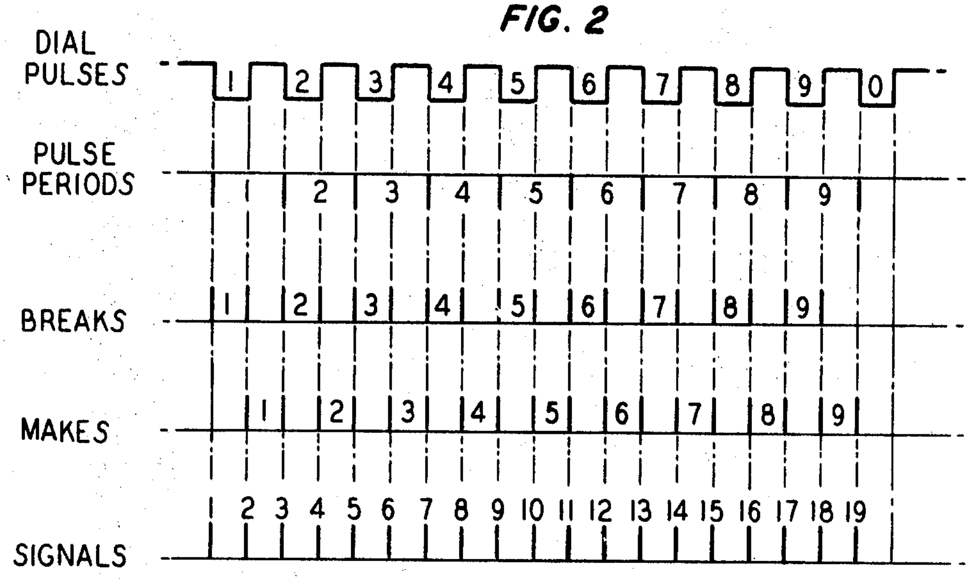
FIG. 2 shows the 10 break intervals in a series of 10 telephone dial pulses and the various signals which can be derived from that series of dial pulses; and, FIGS. 3 through 39 show circuitry and symbols used in the detailed circuit disclosure of FIGS. 40 through 44.

FIG. 2 illustrates the various parts of and the signals which can be derived from a series of telephone dial pulses. The top line in FIG. 2 shows the 10 break intervals 1 to 0 produced by a dialing of the digit 10. Of course, as is well known, the lengths of the makes and breaks can vary over quite a range. Percent break for any pulse period is the ratio of the length of the break to the length of the pulse period. Speed is the number of pulse periods occurring in a unit of time, such as a second.

The next-to-the-top line in FIG. 2 shows the 10 signals (spikes) defining the boundaries of the nine full pulse periods of the top line.

The middle line in FIG. 2 shows the 18 signals defining the boundaries of the nine break intervals.

The next-to-the-bottom line in FIG. 2 shows the 18 signals defining the boundaries of the nine make intervals.

The bottom line in FIG. 2 shows the 19 signals defining all of the significant transitions of the nine full pulse periods.

The detailed circuit disclosure to be described hereinafter goes on the assumption that break intervals are high and make intervals are low. It will be apparent to those skilled in the art that the dial pulse input circuitry, such as the box designated DIAL PULSES in the block diagram of FIG. 1 and such as the box designated DIAL PULSE INPUT in FIG. 43 may be arranged to feed to a measuring circuit any desired polarities of signal conditions.

In a measuring circuit, such as disclosed in FIGS. 40 through 44, using clock controlled digital technique, it would be desirable to arrange the dial pulse input to be synchronized to the clock pulse source in order to minimize small errors which might arise due to an out-of-phase condition. Any desired such synchronizing circuit could be part of the dial pulse input. One such arrangement is the subject matter of an application of R. B. Heick, Ser. No. 849,997 filed on Aug. 14, 1969 and allowed on Dec. 16, 1970 for "Delayed Clock Pulse Synchronizing of Random Input Pulses." While such synchronism may be desirable, it is not necessary since, as will be shown hereinafter, the measuring circuit can function with nonsynchronous dial pulse input and can do so with negligible error.

In FIG. 2 it will be seen that among the odd series of 19 signals there are nine alternate consecutive pairs of signals defining the nine break intervals. The detailed circuitry to be described is arranged to measure the average break interval over the nine pulse periods in terms of a percentage of the average pulse period.

BLOCK DIAGRAM

Figures 1, 45:
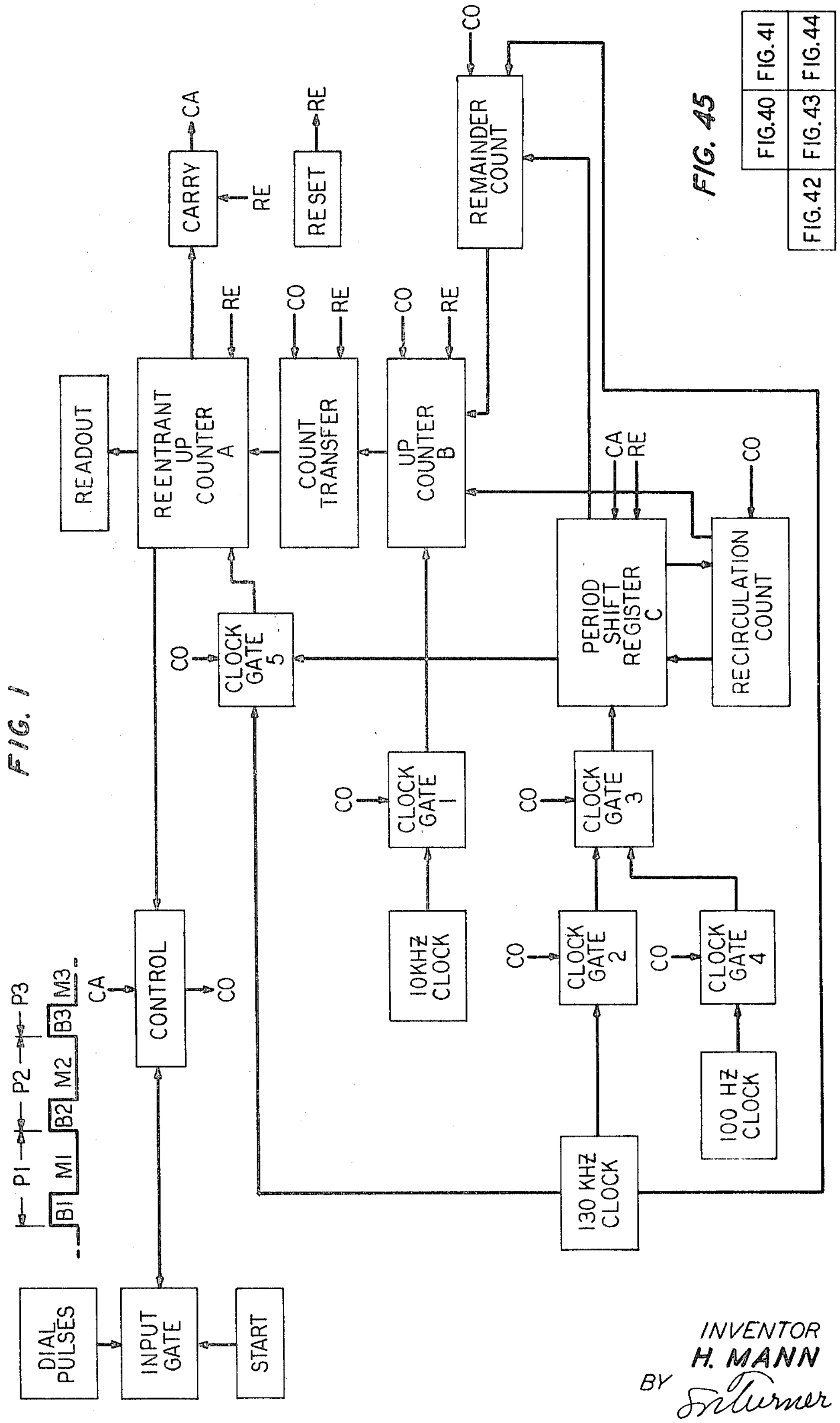
FIG. 1 is a functional block diagram of the detailed circuit disclosure shown in FIGS. 40 through 44 arranged as shown in FIG. 45 (same sheet as FIG. 1)

FIG. 1 is a block diagram showing the main functional parts of the detailed circuit disclosure of FIGS. 40 through 44. In the upper part of the diagram is illustrated a train of telephone dial pulses including the first two pulse periods P1 and P2, each made up of a high break interval (B1 and B2) and a low make interval (M1 and M2). Part of the third pulse period P3 is shown; but, it will be understood that as many pulse periods as are desired may be used. The particular embodiment used herein is arranged to measure percent break over the first nine full pulse periods of a train of pulses such as shown in the top line of FIG. 2.

One of the significant characteristics of telephone dial pulsing is the so-called "percent break," which is the percentage of a full pulse period (P1, P2, P3, etc.) occupied by the break interval (B1, B2, B3, etc.). Over a series of pulses (pulse periods) the true average percent break or average duty cycle is the sum of all ratios of B to P divided by the number of pulse periods N. The approximate average duty cycle is the ratio of average break interval to average pulse period. The break intervals and pulse periods are "measured" by counting the number of clock pulses occurring within those times. A 100 Hz. clock (100 clock pulses per second) is used to measure pulse periods and a 10 kHz. clock (10,000 clock pulses per second) is used to measure break intervals. 100 Hz. clock pulses are counted for the duration of nine pulse periods and 10 kHz. clock pulses are counted for the sum of the corresponding nine break intervals. Dividing the total 10 kHz. count by the total 100 Hz. count provides a close approximation to average percent break over that number of pulse periods. Assuming a train of nine pulse periods (100 milliseconds each) at a dialing speed of 10 pulses per second (pps) with a break interval of 60 milliseconds (msec. and a make interval of 40 msec., the 10 kHz. clock count would accumulate for 540 msec. and the 100 Hz. clock count would accumulate for 900 msec. The total 10 kHz. count would be 5,400 and the total 100 Hz. count would be 90. Dividing 5,400 by 90 provides an answer of 60.0 percent. If, as occurs in actual practice, the total pulse period should vary slightly over a train of pulses and the break interval should vary slightly from pulse period to pulse period, the sums of the two clock pulse counts would vary from the above values of 5,400 and 90. For instance, the summation of the pulse periods might be 5,850 and the summation of the break intervals might be 92 providing an answer of 63.59 percent.

In the block diagram of FIG. 1, the 100 Hz. clock inserts clock pulses into the period shift register C for the time of nine pulse periods and the 10 kHz. clock inserts clock pulses into counter B for the time of nine break intervals. The break count in counter B is then transferred as the nine's complement to counter A (counters A and B having the same count capacity) and counter B is cleared to zero count. Then, the count in the shift register C is recirculated while being serially added to counter A (addition of count C to the nine's complement of count B equals subtraction of count C from count B). Each recirculation in shift register C is referred to as a block count—i.e., a count of the total clock count in shift register C. When counter A goes from capacity count to zero count, the accumulated block count will equal the number of full block counts required to dissipatively reduce the count in counter A to zero. The remaining partial block count in the shift register C is then taken into account to arrive at a fractional value. The full and fractional block count values are placed into counter B and transferred to counter A which controls the readout circuit to provide a visual display of the average percent break.

Specifically with reference to the block diagram of FIG. 1, when the system is reset (or cleared or normalized) counter B is set to zero count, counter A is set to capacity count (counters A and B having the same capacity), the carry is cleared (no carry signal on lead CA), and the shift register C is cleared: also, the input gate is arranged to pass the dial pulse input to the control so that the leading and trailing edges of the break intervals can be used for control purposes. In response to the input dial pulses the control enables gate 1 to pass 10 kHz. clock pulses to counter B during the nine break intervals and enables gates 3 and 4 to pass 100 Hz. clock pulses to shift register C during the nine pulse periods. At the conclusion of the nine pulse periods, the control disables gates 1 and 4, enables the transfer circuit to place in counter A the nine's complement of the count in counter B, clears counter B to zero count, enables the recirculation count circuit, and enables gates 2, 3, and 5. The 130 kHz. clock source causes the count in shift register C to recirculate while being serially added into counter A. The recirculation count circuit counts the number of times (block count) the count in shift register C recirculates the causes this block count to accumulate in counter B. When the count in counter A goes from capacity count to zero count, the carry circuit causes the control to disable the recirculation count circuit and to enable the remainder count circuit to add into counter B, as a fractional block count, the remainder still in the shift register C. When the remainder operation is finished, the control transfers the full and fractional block count in counter B to counter A as the nine's complement to permit the readout circuit to decode and display the answer.

The circuit is arranged to measure an approximation of pulsing speed by inserting into counter B a prescribed value such as 9,000, by accumulating 100 Hz. clock pulses in the shift register C for nine pulse periods (900 milliseconds for a pulsing speed of 10 pps), and dividing the 9,000 in counter B by the 90 in shift register C to arrive at an answer of 100, which with the decimal point in the right place becomes a speed of 10.0 pps.

DETAILED CIRCUIT DESCRIPTION

Figure 40:
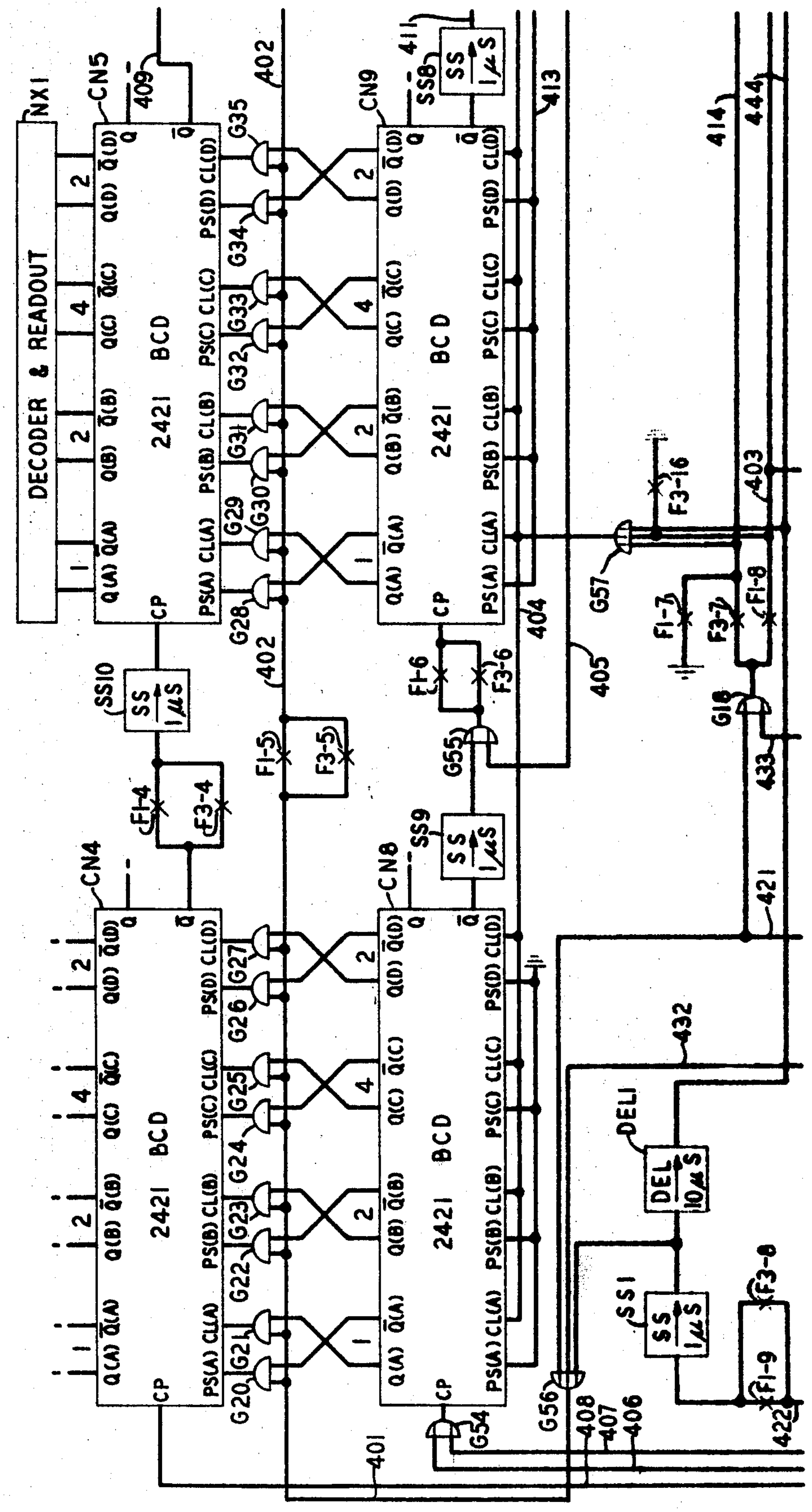
Figure 41:
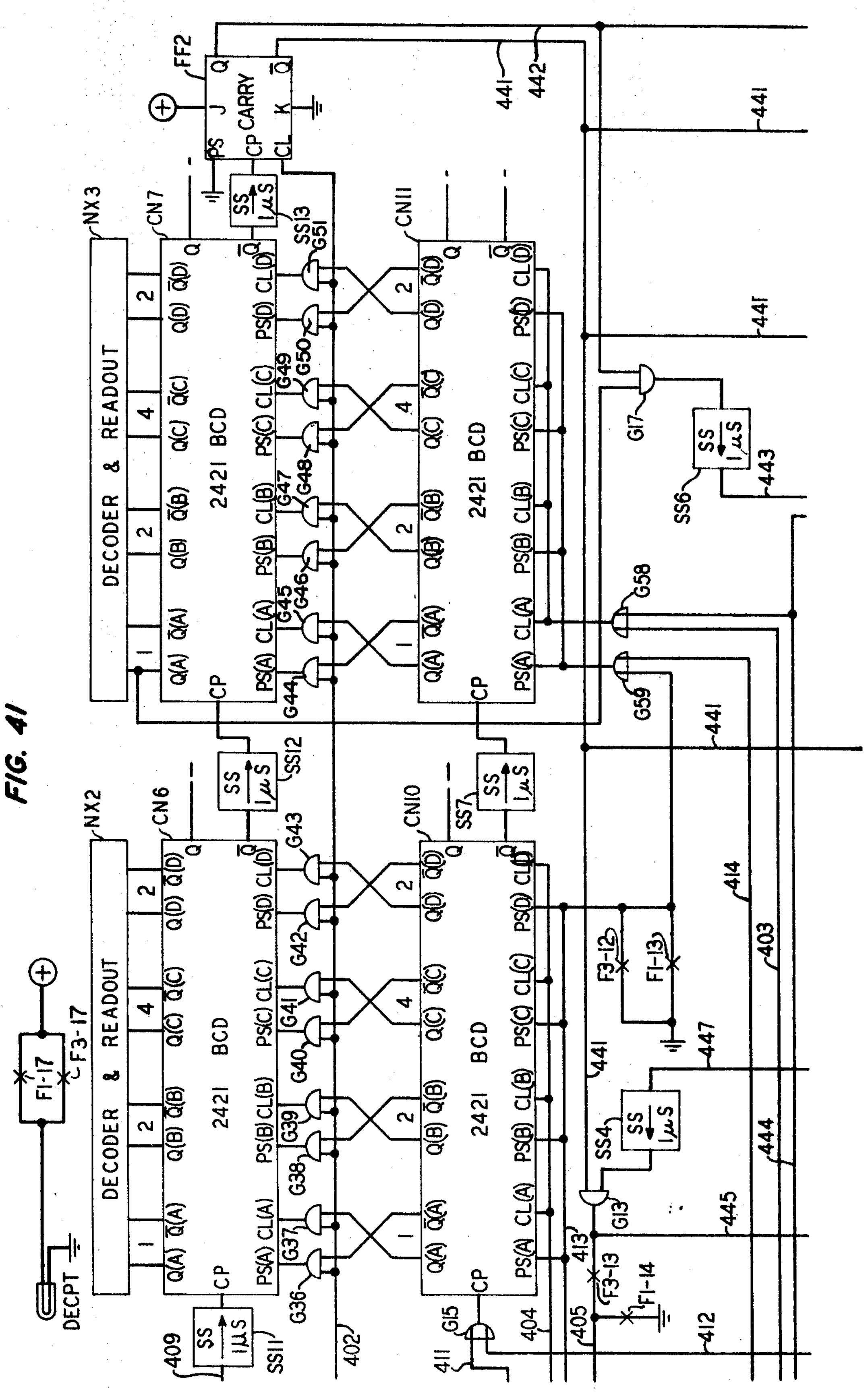
Figure 42:
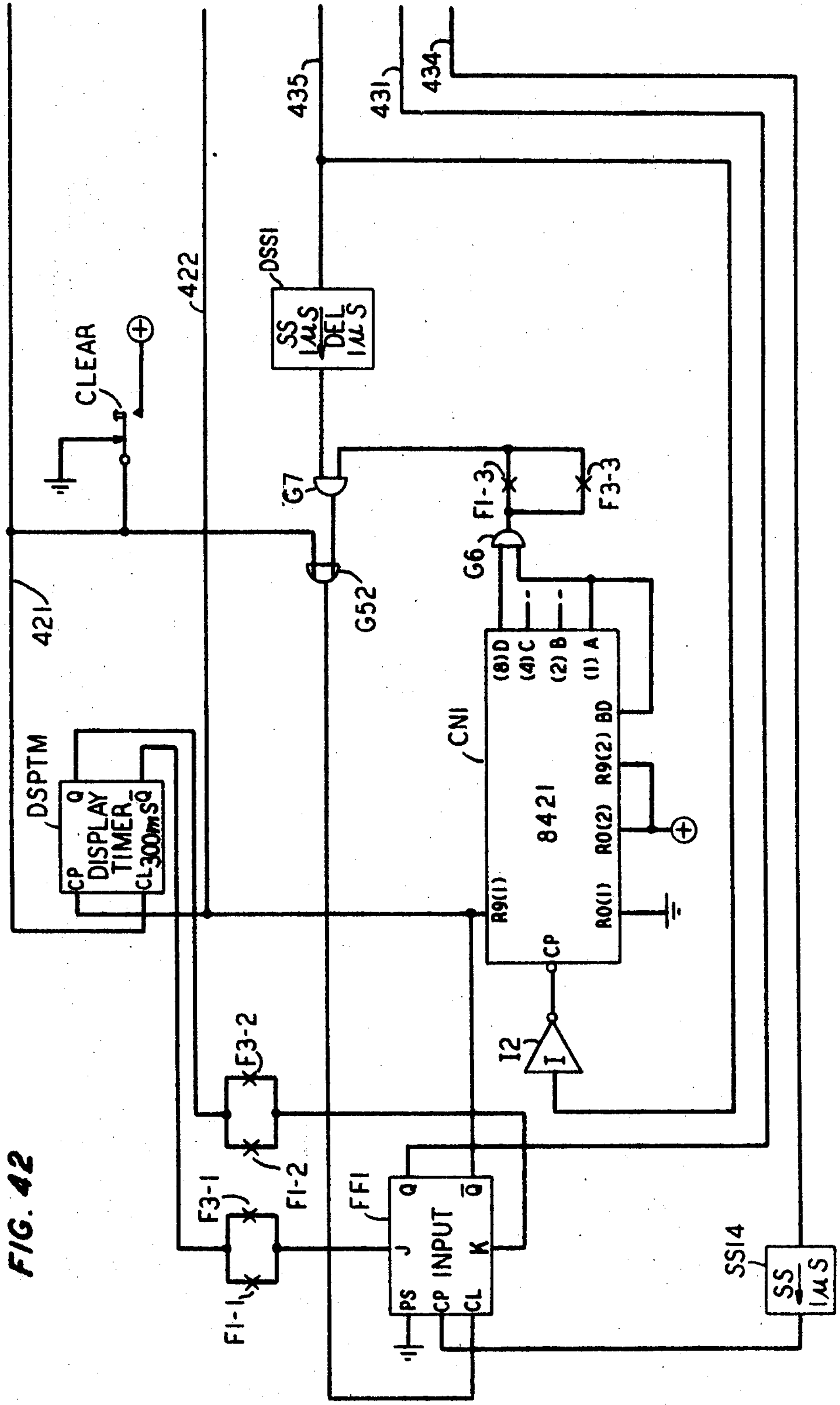
Figure 43:
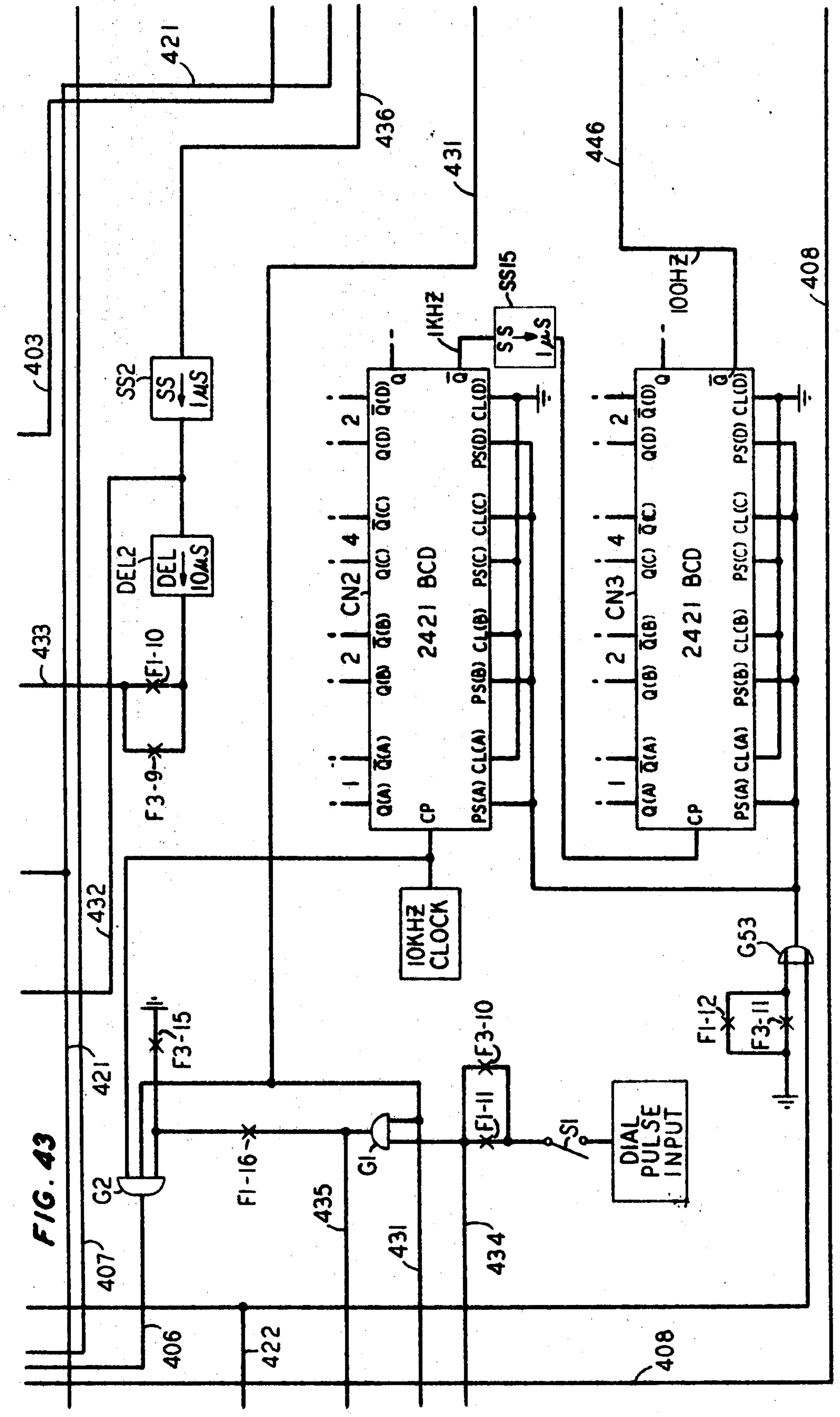

Before proceeding with the detailed circuit description, certain switches and switch contacts in FIGS. 40 through 44 warrant brief comment. In FIGS. 40 through 44 are shown switch contacts F1-1 through F1-17 which are controlled by an F1 switch which is operated to close contacts F1-1 through F1-17 when the circuit is used to measure percent break (%BK) and which is released to open contacts F1-1 through F1-17 when the circuit is used to measure pulsing speed (pps). Also, switch contacts F3-1 through F3-17 are shown and are controlled by an F3 switch which is operated (closed contacts) when the circuit is used to measure pulsing speed (pps) and which is released (contacts open) when the circuit is used to measure %BK. In FIG. 43 is shown a switch S1 which when closed (shown open) allows input dial pulses to be applied to the measuring circuit. In FIG. 42 is shown a switch designated CLEAR and having a swinger cooperating with a back contact (connected to ground, low) and a front contact (connected to +, high). When the clear switch is operated, the break contact opens before the make contact closes: when the clear switch is released, it is spring loaded to return to its normal positions (as shown) with the make contact opening before the break contact closes.

Starting Conditions

The following test conditions are assumed 1. switch F1 is operated and switch F3 is released to enable measurement of %BK;

2. switch S1 in FIG. 43 is open so that no input dial pulses are supplied to the circuit; and, 3. as in FIG. 1, break intervals are high and make intervals are low as supplied by the DIAL PULSE INPUT in FIG. 43.

With contact F1-17 closed in FIG. 41, the decimal point lamp DECPT, which is physically located between readout circuits NX2 of FIG. 41 and NX1 of FIG 40, is lighted in an obvious circuit. The readout circuits NX1, NX2 and NX3 of FIGS. 40 and 41 include any well known circuitry for translating the 2421 binary code of the counters CN5, CN6 and CN7 to decimal values for lighting decimal lamps. For instance, if at the end of a %BK measurement counters CN7, CN6 and CN5 should contain counts indicative of respective decimal values of 6, 1 and 2, then the corresponding readout circuits NX3, NX2 and NX1 would visually show the respective decimal digits 6, 1 and 2 with the lamp DECPT located between the 1 and the 2 to provide an answer of 61.2 %BK. A typical visual display of pulsing speed might be 10.5, etc.

Clearing the System

The circuit is cleared or normalized manually by the momentary operation in FIG. 42 of the CLEAR switch. Subsequently, description will be provided of how the circuit clears itself automatically for measuring %BK over repeated groups of pulses.

Figure 44:
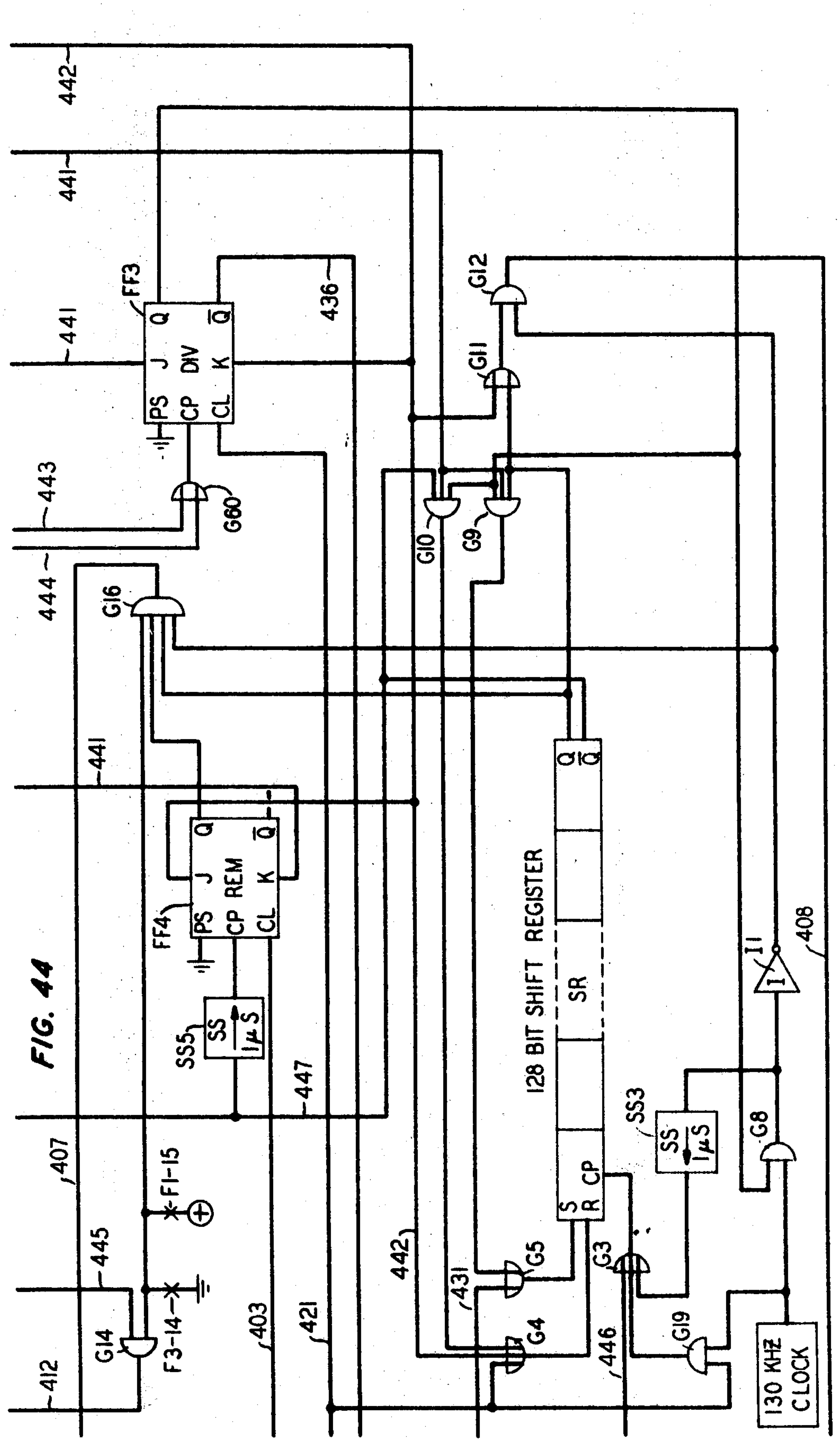

Operation of the CLEAR switch results in the following circuit functions:

1. the display timer DSPTM in FIG. 42 is cleared to its stable state (Q low—$\bar{Q}$ high);

2. the input flip-flop FF1 in FIG. 42 is cleared (Q low—$\bar{Q}$ high);

3. the transfer gates G20 through G35 of FIG. 40 and G36 through G51 of FIG. 41 are enabled;

4. the carry flip-flop FF2 of FIG. 41 is cleared (Q low—$\bar{Q}$ high);

5. the division and remainder flip-flops FF3 and FF4 of FIG. 44 are cleared (Q low—$\bar{Q}$ high);

6. the lower register (counters CN8, CN9, CN10 and CN11 of FIGS. 40 and 41) is cleared to contain zero count (0000) so that the outputs Q(A) through Q(D) are low and the outputs $\bar{Q}$(A) through $\bar{Q}$(D) are high—outputs Q and $\bar{Q}$ are the same as outputs Q(D) and $\bar{Q}$(D);

7. the upper register (counters CN4, CN5, CN6 and CN7 of FIGS. 40 and 41) is set to capacity count (9999) so that the outputs Q(A) through Q(D) are high and the outputs $\bar{Q}$(A) through $\bar{Q}$(D) are low—outputs Q and Q are the same as outputs Q(D) and Q(D);

8. the counter CN1 in FIG. 42 is set to a count of 9;

9. the counters CN2 and CN3 of FIG. 43 are each set to a count of 5; and, 10. the shift register SR in FIG. 44 is cleared (contains all zeros)—output $\bar{Q}$ will be high and output Q will be low.

When the CLEAR switch in FIG. 42 is operated, a high is applied over its make contact to lead 421 extending into FIGS. 40, 42, 43 and 44. When the CLEAR switch is released (after the clearing operation), a low is applied to lead 421 over its break contact.

The high on lead 421 in FIG. 42 is applied to the CL input of the display timer to clear it (Q low—$\bar{Q}$ high) to its stable condition unless it is already in that condition.

With a low on its CP input from SS14, FF1 in FIG. 42 is cleared by the high on lead 421 through gate G52 to its CL input, thus making output Q of FF1 low and output $\bar{Q}$ of FF1 high.

The high on lead 421 in FIG. 40 extends through gate G56 to lead 401 to the left inputs of transfer gates G20 through G27, thence over contact F1-5 and conductor 402 to the left inputs of gates G28 through G35, thence over lead 402 into FIG. 41 and to the left inputs of gates G36 through G51. These transfer gates G20 through G51 of FIGS. 40 and 41 are enabled by this high or their left inputs to pass to the preset PS(−) or clear CL(−) inputs of the upper register (counters CN4, CN5, CN6 and CN7) whatever highs may then exist on the Q(A) through Q(D) and $\bar{Q}$(A) through $\bar{Q}$(D) outputs of the lower register (counters CN8, CN9, CN10 and CN11).

The high on lead 402 in FIG. 41 extends to the CL input of the carry flip-flop FF2 which is thereby cleared (Q low—$\bar{Q}$ high) since its Cp input is held low from SS13.

The division flip-flop FF3 in FIG. 44 is cleared (Q low—$\bar{Q}$ high) by the high at its CL input from lead 421 since the CP input of FF3 is held low from the output of gate G60 whose upper input is held low over lead 443 into FIG. 41 from SS6 and whose lower input is held low over lead 444 into FIGS. 41 and 40 from DEL1.

The high on lead 421 in FIG. 40 extends through gate G18 and contact F1-8 to lead 403, thence through FIG. 43 into FIG. 44 to the CL input of the remainder flip-flop FF4. Since the CP input of FF4 is held low from SS5, the high on its CL input clears it (Q low—$\bar{Q}$ high).

The high in FIG. 41 on lead 403 extends through gate G58 to the clear inputs CL(A) through CL(D) of counter CN11 to clear it since its CP input is eventually held low from SS7. The Q(A) through Q(D) outputs of counter CN11 are set low and its outputs Q(A) through $\bar{Q}$(D) are set high. The high in FIG. 40 on lead 403 extends through gate G57 to lead 404 (and into FIG. 41) to the clear inputs CL(−) of the counters CN8, CN9 and CN10 (each of whose CP inputs is held low) to clear these counters also. The CP input of counter CN10 in FIG. 41 is held low by gate G15 both of whose inputs are low: the upper input to gate G15 is held low on lead 411 from SS8 in FIG. 40; and, the lower input of gate G15 is held low on lead 412 from the output in FIG. 44 of gate G14, the upper input to which is held low over lead 445 from the output in FIG. 41 of gate G13, the lower input to which is held low from SS4. The CP input of counter CN9 in FIG. 40 is held low through contact F1-6 from the output of gate G55 both of whose inputs are held low: the upper input to gate G55 is held low from SS9; and, the lower input to gate G55 is held low on lead 405 into FIG. 41 from contact F1-14. The CP input of counter CN8 in FIG. 40 is held low from gate G54 both of whose inputs are held low: the upper input to gate G54 is held low on lead 406 into FIG. 43 from the output of gate G2 whose lower input is held low through contact F1-16 from gate G1 whose right input is held low over lead 431 into FIG. 42 to the low Q output of FF1; and, the lower input of gate G54 in FIG. 40 is held low over lead 407 through FIG. 43 into FIG. 44 from the output of gate G16 whose next-to-upper input is held low from the low Q output of FF4.

In FIGS. 40 and 41, the CP inputs of counters CN5, CN6 and CN7 are held low from the respective single-shots SS10, SS11 and SS12. In FIG. 40, the CP input of counter CN4 is held low on lead 408 through FIG. 43 into FIG. 44 from the output of gate G12, the upper input of which is held low from gate G11, the upper input to which is held low on lead 442 from the low Q output in FIG. 41 of FF2. Under these circumstances the upper register (counters CN4, CN5, CN6 and CN7 of FIGS. 40 and 41) will be set to the nine's (one's in binary form) complement of the setting of the lower register (counters CN8, CN9, CN10 and CN11 of FIGS. 40 and 41). Since the lower register is cleared (all set to zero), the upper register will be set to capacity count (all nine's). For example, taking counters CN8 and CN4 of FIG. 40, with counter CN8 set at zero, its outputs Q(A), Q(B), Q(C) and Q(D) will be low and its outputs $\bar{Q}$(A), $\bar{Q}$(B), $\bar{Q}$(C) and $\bar{Q}$(D) will be high. The highs on the $\bar{Q}$(−) outputs of CN8 will pass through the enabled gates G20, G22, G24 and G26 to the preset inputs PS(A), PS(B), PS(C) and PS(D) of counter CN4 to set all stages thereof to binary one or a capacity count of decimal 9, the nine's complement of the zero in counter CN8. Likewise, the counters CN5, CN6 and CN7 of FIGS. 40 and 41 will be preset to 999, the complement of the 000 in the corresponding lower register counters CN9, CN10 and CN11.

In FIG. 42, counter CN1 will be set to the count of nine. The high on its R9(1) input from the high $\bar{Q}$ output of FF1, with the R9(2) input held high, forces counter CN1 to a count of nine—A output high, B output low, C output low and D output high.

In FIG. 43, the counters CN2 and CN3 will each be set to a count of 5. The CP input of counter CN3 is held low from SS15. The CP input of counter CN2 will be low on each low from the 10 kHz. clock pulse source (each cycle producing for example 50 microseconds low and 50 microseconds high). The high in FIG. 42 from the $\bar{Q}$ output of FF1 extends over lead 422 into FIG. 43 and through gate G53 to the inputs PS(A), PS(B), CL(C) AND PS(D) of each of the counters CN2 and CN3. This sets these counters to counts of 5 with their outputs Q(A), Q(B), $\bar{Q}$(C) and Q(D) high and their outputs $\bar{Q}$(A), $\bar{Q}$(B), Q(C) and $\bar{Q}$(D) low. Since their main $\bar{Q}$ outputs are the same as their $\bar{Q}$(D) outputs, their main $\bar{Q}$ outputs will be low.

In FIG. 44, the shift register SR will be cleared so that it contains all zeros with its Q output low and its Q output high. The S input to shift register SR is held low from gate G5 both of whose inputs are low: the right input of gate G5 is held low from gate G9 whose upper input is held low from the low Q output of FF3; and, the left input to gate G5 is held low on lead 431 from the low Q output in FIG. 42 of FF1. The R input to shift register SR is held high from gate G4 whose left input is held high on the high clear signal on lead 421. With S low and input R high, (actually, either condition prevailing by itself is sufficient) shift register SR is responsive to high pulses on its CP input to inject zeros into the first cell and to shift everything along. The CP input is fed from gate G3: the upper input of gate G3 is held low on lead 446 from the low $\bar{Q}$ output in FIG. 43 of counter CN3; and, the lower input of gate G3 in FIG. 44 is held low from SS3. Gate G3 can thus pass high signals which are supplied to its middle input from gate G19. The left input of gate G19 is held high from the high on the clear lead 421: the right input to gate G19 is connected to the output of the 130 kHz. clock, which, for example, supplies highs and lows of a little less than about 4 microseconds each. The highs from the 130 kHz. clock will thus pass through gates G19 and G3 to the CP input of the shift register to clear it (set all cells to zero) in something of the order of a millisecond.

When the CLEAR switch in FIG. 42 is released, after its momentary operation for clearing the system, the high on lead 421 in FIGS. 40, 42, 43 and 44 is replaced by a low to produce the following results:

1. the display timer DSPTM in FIG. 42 is made responsive to a low-to-high transition at its CP input;

2. the input flip-flop FF1 in FIG. 42 is made responsive to a low-to-high transition at its CP input;

3. the transfer gates G20 through G51 of FIGS. 40 and 41 are disabled, thus rendering the upper register counters CN4, CN5, CN6 and CN7 responsive to low-to-high transitions at their CP inputs by making all of their PS(−) and CL(−) inputs low;

4. all of the PS(−) and CL(−) inputs to the lower register counters CN8, CN9, CN10 CN11 are made low, thereby rendering these counters responsive to low-to-high transitions at their CP inputs; and, 5. the clearing operation in the shift register SR of FIG. 44 is stopped.

With the display timer DSPTM in FIG. 42 in its stable state (Q low—$\bar{Q}$ high) with its clear input CL held low over the back contact of the CLEAR switch, a low-to-high transition at its CP input will trigger DSPTM into its unstable timing state (Q high—Q low) where it will remain for about 300 msec. and then revert to its stable state (Q low—$\bar{Q}$ high) again. This operation, to be discussed later, will happen only after the input flip-flop FF1 is switched from its one state (Q high—$\bar{Q}$ low) to its zero state (Q low—$\bar{Q}$ high).

THe left inputs in FIGS. 40 and 41 of the transfer gates G20 through G51 are made low from the output of gate G56 in FIG. 40, thus to render all of the PS(−) and CL(−) inputs to counters CN4, CN5, CN6 and CN7 low: this will render these counters responsive to low-to-high transitions on their CP inputs at a time and for a purpose to be described later. The output in FIG. 40 of gate G56 is low because all of its inputs are low: the lower input is held low from SS1; the middle input is held low on lead 432 into FIG. 43 from SS2; and, the upper input is made low when lead 421 is made low from the back contact in FIG. 42 of the CLEAR switch. The CP input of counter CN4 in FIG. 40 is held low on lead 408 extending through FIG. 43 into FIG. 44 to the output of gate G12, the upper input of which is held low from gate G11 both of whose inputs are low, the upper one on lead 442 from the low Q output in FIG. 41 of FF2, the lower one from the low Q output of the cleared shift register SR. The output of gate G12 in FIG. 44 will carry high pulses (for driving counter CN4 of FIG. 40) only at a subsequent stage of the circuit operation.

In FIG. 40, the low on lead 421 renders the output of gate G18 low since the lower input to gate G18 is held low on lead 433 into FIG. 43 and over contact F1-10 to the low output of DEL2. The low output of gate G18 in FIG. 40 renders the outputs of gates G57 (FIG. 40) and G58 (FIG. 41) low to render low all of the CL(−) inputs of counters CN8, CN9, CN10 and CN11. The PS(−) inputs of counter CN8 in FIG. 40 are held low to ground; the PS(−) inputs in FIGS. 40 and 41 of counters CN9 and CN10 are held low on lead 413 to ground in FIG. 41 over contact F1-13; and, the PS(−) inputs in FIG. 41 of counter CN11 are held low from gate G59, the left input of which is low from contact F1-13 and the right input of which is held low over lead 414 into FIG. 40 to ground over contact F1-7. This makes low all of the PS(−) and CL(−) inputs of all of these counters, thus making them responsive, when the time comes, to low-to-high transitions at their CP inputs. In the meantime, input CP of counter CN11 in FIG. 41 is held low from SS7, input CP of counter CN10 in FIG. 41 is held low from gate G15, input CP of counter CN9 in FIG. 40 is held low from gate G55, and input CP of counter CN8 in FIG. 40 is held low from gate G54.

When the clear lead 421 is made low at the back contact in FIG. 42 of the CLEAR switch, in FIG. 44 the left input to gate G19 is made low to prevent further clock pulses (130 kHz. clock) from passing through gate G19. The CP input to shift register SR is held low from gate G3 all of whose inputs are low, the upper one over lead 446 from the low $\overline{Q}$ output of counter CN3 in FIG. 43, the middle one from gate G19, and the lower one from SS3. In FIG. 44, the upper input of gate G8 is held low from the low Q output of FF3, thus to block clock pulses (130 kHz.) from passing through gate G8. Eventually, as will be described below, high clock pulses from counter CN3 of FIG. 43 will be passed over lead 446 (100 Hz.) into FIG. 44 and through gate G3 to the CP input of shift register SR.

In FIG. 42, the low on lead 421 from the back contact of the CLEAR switch renders the output of gate G52 low since the lower input of gate G57 is held low from gate G7, the right input of which is held low from DSS1. The low output of gate G52 makes the clear input CL of the input flip-flop FF1 low so that FF1 can respond to a low-to-high transition on its CP input to initiate the processing of the %BK operation.

Summary of Clearing Operation

At this point in the circuit operation, as described above, the following conditions prevail before the start of the circuit functioning:

1. in FIG. 42, counter CN1 is set to a count of 9;

2. in FIG. 43, counters CN2 and CN3 are both set to counts of 5;

3. in FIGS. 40 and 41, the upper register is set to capacity count with each of the counters CN4, CN5, CN6 and CN7 set to 9;

4. in FIGS. 40 and 41, the lower register is set to zero count with each of the counters CN8, CN9, CN10 and CN11 set to o; and, 5. in FIG. 44, the shift register SR is cleared with zeros in all of its 128 cells.

As will appear from the subsequent description, the following will take place as the result of making measurements during the assumed input of 10 break intervals making up the signals included in the "dialing" of the digit zero;

1. the input flip-flop FF1 in FIG. 42 will respond to the first low-to-high transition at the leading edge of the first high break interval to start the circuit functioning;

2. the counter CN1 in FIG. 42 will count the low-to-high transitions at the leading edges of the ten high break intervals so that the input flip-flop FF1 will be cleared at the leading edge of the 10th break to stop that part of the circuit operations involved with accumulating the necessary measurements to be used for calculating the %BK answer;

3. the lower register (counters CN8, CN9, CN10 and CN11 of FIGS. 40 and 41) will count the 10 kHz. clock pulses which occur during the cumulative time of the first nine break intervals;

4. the counters CN2 and CN3 in FIG. 43 will produce 100 Hz. clock pulses during the entire time of the first nine full pulse periods (from signal 1 to signal 19 in the bottom line of FIG. 2); and, 5. the shift register SR in FIG. 44 will accumulate the 100 Hz. clock pulse count during the first nine full pulse periods.

With the above measurements made, the information accumulated during the first nine full pulse periods will enable the circuit to enter its calculation phase where the 10 kHz. break count in the lower register will be divided by the 100 Hz. pulse period count in the shift register to arrive at a %BK answer.

Leading Edge of First Break

Assume that switch S1 in FIG. 43 is now closed and that a series of dial pulses like the top line of FIG. 2 is supplied by the DIAL PULSE INPUT of FIG. 43 with the break intervals arranged to be high and the make intervals arranged to be low.

The leading edge of the first break interval (low-to-high transition) extends in FIG. 43 through contact F1-11 and over lead 434 into FIG. 42 to the input of single-shot SS14, which will repeat a one microsecond high pulse at its output to the CP input of FF1. This high pulse at the CP input of FF1, with its J input high and its K input low, causes its Q output to go high and its $\overline{Q}$ output to go low. The low $\overline{Q}$ output of FF1 makes the R9 (1) input of counter CN1 low to permit counter CN1 to count high-to-low pulses at its CP input. The low $\overline{Q}$ output of FF1 also extends over lead 422 into FIG. 43 to make the output of gate G53 low to in turn render low all of the PS(−) and CL(−) inputs of counters CN2 and CN3 to enable these counters to respond to low-to-high transitions at their CP inputs. The high Q output of FF1 in FIG. 42 extends over lead 431 into FIG. 43 to the right input of gate G1 to enable gate G1 to pass the high break interval. Also, in FIG. 43, the high on lead 431 connects to the middle input of gate G2 to enable gate G2 to pass 10 kHz. clock pulses at its upper input as soon as gate G1 repeats the high break to the lower input to gate G2. Also, the high on lead 431 in FIG. 43 extends into FIG. 44 to the left input to gate G5 to make its output high at the S input of shift register SR, to in turn render shift register SR responsive to low-to-high pulses at its CP input to inject one's and to shift the contents.

As soon as the high Q output of FF1 in FIG. 42 is effective on lead 431 in FIG. 43 at the right input to gate G1, gate G1 provides a low-to-high transition output essentially at the leading edge of the first break interval. This high output of gate G1 extends over lead 435 into FIG. 42 and through inverter I2 to produce a high-to-low transition at the CP input of counter CN1. Counter CN1 steps from its starting count of 9 (outputs A and D high outputs B and C low) to a count of 0 (all outputs low). With a low on either output A or D of counter CN1, gate G6 provides a low output through contact F1-3 to the lower input to gate G7: this keeps the output of gate G7 low when the delayed single-shot DSS1 provides a delayed high pulse responsive to the low-to-high transition on lead 435 (which causes counter CN1 to go from a count of 9 to a count of 0). Thus, the pulse from DSS1 is not effective to pass through gate G7. As will be mentioned hereinafter, when counter CN1 of FIG. 42 will have counted the leading edge (low-to-high) of the tenth break interval (end of the first nine full pulse periods—see FIG. 2), the outputs A and D of counter CN1 will have for the first time (since the starting conditions) become both high. That condition, when it is reached, will permit gate G7 to pass the delayed high pulse from DSS1 so as to stop the circuit action and to start a 300 msec. time period during which the circuit is renormalized prior to measurement of another series of dial pulses.

As soon as counters CN2 and CN3 of FIG. 43 are rendered responsive (at the leading edge of the first high break) to clock pulses from the 10 kHz. source, counter CN2 will advance on each 10 kHz. clock pulse (high) from its starting count of 5 to 6 to 7 to 8 to 9 to 0 to 1 to 2 to 3 to 4 to 5, etc. Each time counter CN2 advances from 9 to 0 its $\bar{Q}$ output provides a low-to-high transition which is repeated by single-shot SS15 as a short high pulse to the CP input of counter CN3. These "clock pulses" at the CP input of counter CN3 will occur at 1 kHz. as a result of the divide-by-10 action of counter CN2 on the 10 kHz. clock pulses at the CP input of counter CN2. By similar action, counter CN3 will divide-by-10 the 1 kHz. pulses at its CP input to provide low-to-high transitions at its $\bar{Q}$ output at a clock rate of 100 Hz. onto lead 446 into FIG. 44. It is recognized, of course, that about one millisecond will be lost before counter CN3 produces the first 100 Hz. clock pulse on lead 446. This delay injects no error of any consequency since these 100 Hz. pulses are for measuring periods of time in the order of 1,000 milliseconds.

In FIG. 44, the 100 Hz. clock pulses (highs) on lead 446 pass through gate G3 to the CP input of shift register SR. Shift register SR will commence to insert one's into the first cell and to shift all contents one cell along the register for each 100 Hz. clock pulse at its CP input.

In FIG. 43, the high output of gate G1 at the leading edge of the first high break interval extends through contact F1-16 to the lower input of gate G2. The middle input of gate G2 is also high on lead 431 from the high Q output in FIG. 42 of FF1. The highs from the 10 kHz. clock will thus pass through gate G2 (upper input) onto lead 406 into FIG. 40 and through gate G54 to the CP input of counter CN8. Each low-to-high 10 kHz. transition at the CP input of counter CN8 will advance the count therein from its starting count of 0 to 1 to 2 to 3 to 4 to 5 to 6 to 7 to 8 to 9 to 0 to 1, etc. Each time counter CN8 goes from a count of 9 to a count of 0 (every ten 10 kHz. clock pulses), it provides at its $\bar{Q}$ output a low-to-high transition, which causes single-shot SS9 to provide a short low-to-high pulse through gate G55 and contact F1-6 to the CP input of counter CN9. Likewise, counter CN9 will provide at its $\bar{Q}$ output a low-to-high transition every time it goes from a count of 9 to a count of 0, thus to cause single-shot SS8 to extend a short high pulse on lead 411 into FIG. 41 and through gate G15 to the CP input of counter CN10. Also, counter CN10 will at its $\bar{Q}$ output provide through single-shot SS7 a high pulse at the input CP of counter CN11 for every 10 INPUT PULSES TO COUNTER CN10. Counters CN11, CN10, CN9 and CN8 will thus accumulate respective thousands, hundreds, tens and units counts of the 10 kHz. clock pulses allowed to reach the CP input in FIG. 40 of counter CN8.

During First Break

From the above it will be appreciated that during the first high break interval from the DIAL PULSE INPUT of FIG. 43 the following circuit action will take place:

1. counter CN1 of FIG. 42 will have advanced from its starting count of 9 to the count of 0 to record recognition of the first break interval;

2. shift register SR of FIG. 44 will have accumulated a count of 100 Hz. clock pulses during the entire break interval; and, 3. the lower register (counters CN8, CN9, CN10 and CN11 of FIGS. 40 and 41) will have accumulated a count of 10 kHz. clock pulses during the entire break interval.

End of First Break

At the end of the first high break interval (leading edge of the first low make interval), the dial pulse input through switch S1 in FIG. 43 goes low through contact F1-11 onto lead 434. This low on lead 434 at the left input of gate G1 causes the output of gate G1 to go low, which extends through contact F1-16 to the lower input to gate G2. The low on the lower input to gate G2 forces the output of gate G2 to go low to prevent further 10 kHz. clock pulses from passing (upper input of gate G2) through gate G2 to lead 406, thus stopping further counting of 10 kHz. clock pulses in the counter CN8 of FIG. 40.

The shift register SR in FIG. 44, however, continues to accumulate 100 clock pulses since the end of the first break interval does not affect the gates controlling the insertion of one's into the shift register (and its shifting action).

During the time of the first make, therefor, the shift register SR of FIG. 44 continues to accumulate and shift one's at the 100 Hz. rate and the lower register (counters CN8, CN9, CN10 and CN11 of FIGS. 40 and 41) stops accumulating pulse counts at the 10 kHz. rate.

Second Break Interval

At the leading edge of the second high break interval, lead 434 in FIG. 43 and the left input of gate G1 again go high. This high produces a low-to-high transition at the output of gate G1 onto lead 435. The high on lead 435 extends into FIG. 42 to advance counter CN1 from 0 to 1. The high output of gate G1 again is effective through contact F1-16 to enable gate G2 to pass 10 kHz. clock pulses to lead 406 into FIG. 40 and through gate G54 to the CP input to counter CN8.

Counter CN8 (and its cooperating counters CN9, CN10 and CN11 of FIGS. 40 and 41) will pick up again the count of 10 kHz. clock pulses which it stopped doing during the first make interval.

The change of input dial pulse information does not affect the shift register SR of FIG. 44 which continues without interruption to accumulate the 100 Hz. clock count.

Through the Ninth Make Interval

The above circuit action repeats itself through the ensuing break and make intervals; and, no change occurs in the pattern of circuit action until the leading edge of the 10th break interval occurs (end of the ninth make interval or end of the ninth full pulse period).

By the end of the ninth make interval two significant results will have occurred:

1. the shift register SR in FIG. 44 will have inserted and shifted along the number of 100 Hz. clock pulses which have occurred during nine full pulse periods; and, 2. the lower register (counters CN8, CN9, CN10 and CN11 of FIGS. 40 and 41) will have accumulated a count of the number of 10 kHz. clock pulses which have occurred during the sum of the first nine high break intervals.

With regard to the shift register SR of FIG. 44, accumulating a clock pulse count at the 100 Hz. rate, a typical dial pulse rate of 10 pps would cause nine full pulse periods to last for about 0.9 seconds such as to cause 90 pulses at the 100 Hz. rate to have set the first (left end) 90 cells at one's and such as to leave the last (right end) 38 cells still at zeros.

With regard to the lower register, accumulating a clock pulse count at the rate of 10 kHz. typical break intervals of 60 msec. each would cause a count of 5,400 in the lower register for the sum of nine break intervals. Counter CN11 (FIG. 41) would be set at 5, counter CN10 (FIG. 41) would be set at 4, and counters CN9 and CN8 (FIG. 40) would each be set at 0.

The next circuit operation, which will be effective at the leading edge of the 10th break, will be to divide the lower register count by the shift register count to arrive at a %BK answer. In the above assumed example—10 pps with 60 msec. breaks—the answer would be 5,400/90=60 percent.

Leading Edge of Tenth Break

At the leading edge (low-to-high transition) of the 10th break, which is the end of the first nine full pulse periods, the counter CN1 of FIG. 42 advances to the count of 9 to effect the following circuit functions:

1. the input flip-flop FF1 of FIG. 42 is cleared (Q low—$\bar{Q}$ high) to prepare the circuit for starting the division phase;

2. the display timer DSPTM of FIG. 42 starts timing a 300 msec. interval during which the circuit is nonresponsive to further input pulses;

3. counter CN1 is held in state 9;

4. no further 10 kHz. clock pulses are added into the lower register;

5. counters CN2 and CN3 of FIG. 43 are reset to their starting counts of 5 to prevent further 100 Hz. clock pulses from being produced;

6. the lower register count is transferred to the upper register as the nine's complement;

7. the lower register is cleared; and, 8. the division flip-flop FF3 of FIG. 44 is set (Q high—$\bar{Q}$ low) to start the division phase.

Regarding counter CN1 of FIG. 42, it will be recalled that counter CN1 started at a count of 9 and advanced one count at the leading edge of each high break interval of the input dial pulses. At the leading edge of the 10th break, counter CN1 will again arrive at the count of 9, making its A and D outputs high. This causes gate G6 to produce a high output through contact F1–3 to the lower input to gate G7. Delayed single-shot DSS1, activated by the high leading edge of the 10th break on lead 435, produces a one microsecond high pulse after a delay of about one microsecond (to allow counter CN1 to stabilize). The high pulse from DSS1 passes through gates G7 and G52 to the CL input of FF1 to reset FF1 (Q low—$\bar{Q}$ high).

When FF1 is reset, the high from its $\bar{Q}$ output is applied to the R9(1) input of counter CN1 to hold it at the count of 9. Also, the high $\bar{Q}$ output of FF1 is applied to the CP input of the display timer DSPTM to set the timer (Q high—Q low) into its unstable state, from which it will reset itself (Q low—$\bar{Q}$ high) after a timed period of about 300 msec. With timer DSPTM in its unstable state, the J and K inputs to FF1 are changed to J low and K high to prevent FF1 from responding to any pulses on its CP input.

The low Q output of FF1 in FIG. 42 extends over lead 431 into FIG. 43 to the middle input of gate G2 and to the right input of gate G1, whose output thereupon goes low to make the lower input of gate G2 low. With the lower and middle inputs of gate G2 low, no further 10 kHz. clock pulses can pass through gate G2 to lead 406, thus stopping the accumulation into counter CN8 of FIG. 40 of the 10 kHz. clock pulse count.

The high $\bar{Q}$ output of FF1 in FIG. 42 extends over lead 422 into FIG. 43 to the bottom input of gate G53, whose output thereupon goes low to cause each of counters CN2 (from the low of the 10 kHz. clock) and CN3 (from the low SS15) to reset to a count of 5. The $\bar{Q}$ output of CN3 thus goes low to stop the supply of 100 Hz. clock pulses over lead 446 into FIG. 44. Thereupon, in FIG. 44 the CP input of shift register SR is held low from gate G3 to stop shifting signals into and through the shift register under control of the 100 Hz. clock.

The high $\bar{Q}$ output of FF1 in FIG. 42 extends over lead 422 through FIG. 43 into FIG. 40 and over contact F1–9 to activate single-shot SS1 to produce a one microsecond high pulse at the lower input to gate G56. Gate G56 thereupon produces a high pulse at its output onto lead 401 to enable all of the transfer gates G20 through G51 of FIGS. 40 and 41. With the transfer gates enabled, the counts then existing in the counters CN8, CN9, CN10 and CN11 of the lower register are transferred as the nine's complement to respective counters CN4, CN5, CN6 and CN7 of the upper register. If, for example, the lower register contains a count of 5,400 (CN11,5—CN10,4—CN9,0—CN8,0), then the upper register will be set at the nine's complement of 5,400 or 4,599 (CN7,4—CN6,5—CN5,9—CN4,9).

The high pulse from single-shot SS1 in FIG. 40, which causes the transfer operation above mentioned, is delayed for 10 microseconds in delay DEL1 and is then applied to lead 444. This high pulse on lead 444 extends through gate G57 in FIG. 40 to lead 404 extending in FIGS. 40 and 41 to the clear inputs CL(−) of counters CN8, CN9 and CN10 to clear these counters to zero count. Also, in FIG. 41, the high pulse on lead 444 extends through gate G58 to clear counter CN11 to zero count.

The delayed high pulse from DEL1 in FIG. 40 on lead 444 also extends from FIG. 41 into FIG. 44 and through gate G60 to the CP input of the division flip-flop FF3. This sets FF3 to Q high and $\bar{Q}$ low since its J and K inputs are respectively high and low (leads 441 and 442) from the respective high $\bar{Q}$ and low Q outputs in FIG. 41 of FF2. The setting of the division flip-flop FF3 (Q high—$\bar{Q}$ low), as will be discussed in detail below, adjusts the circuit to perform the division phase of the overall circuit operation.

Starting the Division Phase

It will be recalled from previous description that at the end of nine full pulse periods the shift register SR of FIG. 44 will have accumulated one's at its input (left end) for the duration of the nine full pulse periods at the rate of 100 Hz., the upper register of FIGS. 40 and 41 will contain the nine's complement of the cumulative clock pulse count at 10 kHz. for the nine break intervals, and the lower register of FIGS. 40 and 41 will be cleared (zero count). The condition of the shift register is that at its input end (left end) it contains a block of one's and at its output end (right end) it contains a block of zeros.

The division phase will amount to recirculating the block count (he block of one's) through the shift register SR while serially adding the block count (a pulse at a time as one's appear in the last cell of the shift register) into the upper register until the upper register exceeds its capacity. The number of block counts required to cause the upper register to exceed its capacity is a measure of percent break. In the example used hereinbefore, if an input pulsing speed of 10 pps is assumed with the breaks lasting for 60 msec. each, the shift register SR will contain a block count of 90 and the upper register will contain a count of 4,599 (the nine's complement of the lower register count of 5,400). The block count of 90 must be added into the upper register 60 times in order to advance the count in the upper register from 4,599 to 9,999. The next single count added into the upper register will cause it to go from capacity count ( 9,999) to zero count (0000). This will set the carry flip-flop FF2 in FIG. 41 so that its Q output is high and its $\bar{Q}$ output is low. The setting of flip-flop FF2 will signal the end of the division process except for taking into account any partial block count remaining in shift register SR. Counter CN11 of FIG. 41 will accumulate a count of tens of block counts; counter CN10 of FIG. 41 will accumulate units of block counts; and, counter CN9 of FIG. 40 will be provided with a tenths value of the partial block count, if any.

When the division flip-flop FF3 in FIG. 44 is set (Q high—$\bar{Q}$ low), gate G8 in FIG. 44 is enabled to cause 130 kHz. clock pulses to be applied to the CP input of shift register SR. This will cause the contents of the shift register SR to be shifted toward the output (right end) and will cause zero's to be injected at the input (left end) behind the shifting block count of one's. The upper input to gate G8 is made high from the high Q output of FF3 in FIG. 44. The 130 kHz. clock pulses (highs) will pass through gate G8 to the input of single-shot SS3, which will produce a high output pulse of about one microsecond for each high 130 kHz. clock pulse. The "clock pulses" at the output of SS3 will pass through gate G3 to the CP input of the shift register SR.

At this time input S of shift register SR is low and input R is high. Input S of shift register SR is held low from gate G5, the left input to which is held low on lead 431 and the right input to which is held low from gate G9. The upper input to gate G9 is held high from the high Q output of FF3; the middle input of gate G9 is held high on lead 441 into FIG. 41 to the high $\bar{Q}$ output of FF2; and, the lower input to gate G9 is low from the low Q output of shift register SR as long as the last cell contains a zero. Input R of shift register SR is held high from gate G4. The left input to gate G4 is held low on lead 421; the middle input to gate G4 is held low on lead 442 into FIG. 41 from the low Q output of FF2; and, the right input to gate G4 is high from the output of gate G10. The lower input to gate G10 is held high from the high Q output of FF3; the middle input to gate G10 is held high on lead 441 into FIG. 41 to the high $\overline{Q}$ output of FF2; and, the upper input to gate G10 is held high from the high $\overline{Q}$ output of shift register SR as long as the last cell contains a zero.

With the S input low and the R input high (actually, either condition alone is sufficient) at shift register SR, high pulses at its CP input will insert zero's at the input and shift the contents toward the output.

Whenever a one first appears in the last cell of shift register SR, its Q output will go from low-to-high and its $\overline{Q}$ output will go from high-to-low. This will occur when the first "one" of the block count has been shifted into the last cell. The high Q output of the shift register will change the output of gate G9 from low to high to in turn cause the output of gate G5 to go high at the S input to shift register SR. The high Q output of shift register SR will also pass through gate G11 to the upper input to gate G12. The lower input to gate G12 extends through inverter I1 to the output of gate G8. Each low clock pulse from the 130 kHz. clock (follows each high clock pulse) will cause the output of gate G8 to go low and the output of I1 to go high at the lower input of gate G12. This produces a high "clock pulse" (130 kHz.) at the output of G12 following a high clock pulse (130 kHz.) which causes a one to appear in the last cell of the shift register. Each such high "clock pulse" from gate G12 extends over lead 408 through FIGS. 44 and 43 into FIG. 40 to the CP input of counter CN4. Thus, each time a one appears in the last cell of shift register SR in FIG. 44, a count of one is added into the upper register.

Also, the one appearing in the last cell of shift register SR in FIG. 44 causes the upper input to gate G10 to go low from the low $\overline{Q}$ output of the shift register SR. This causes the output of gate G10 to go low to in turn cause the output of gate G4 to go low at the R input to the shift register SR. With its S input high and its R input low, the shift register will insert a one into the first cell under control of the 130 kHz. clock through gate G8 and single-shot SS3. Thus, each one which appears at the last cell is reinserted into the first cell. In this manner the entire block count of one's is recirculated through shift register SR while being serially added into the upper register one pulse at a time as one's are shifted into the last cell of the shift register SR.

End of First Block Count

The end of the first block count (block of one's) in shift register SR in FIG. 44 is signaled by the appearance in the last cell of a zero, which will make the Q output go from high-to-low and the $\overline{Q}$ output go from low-to-high.

The transition from low-to-high at the $\overline{Q}$ output of shift register SR extends over lead 447 to the inputs in FIGS. 44 and 41 of single-shots SS5 and SS4. Single-shot SS5 (FIG. 44) produces a short high pulse at the CP input of the remainder flip-flop FF4; but, FF4 stays in its cleared state (Q low—$\overline{Q}$ high) since its J and K inputs are held respectively low and high as previously discussed. Single-shot SS4 (FIG. 41), however, will produce a short high pulse at the lower input to gate G13, which passes the high pulse (upper input to gate G13 held high on lead 441 from the high $\overline{Q}$ output in FIG. 41 of FF2) over lead 445 into FIG. 44, through gate G14 (lower input is held high through contact F1-15), over lead 412 into FIG. 41, and through gate G15 to the CP input of counter CN10, which is thereupon advanced from a count of 0 to a count of 1 to register one block count.

In the meantime, the Q low and $\overline{Q}$ high outputs of the shift register SR in FIG. 44 readjust gates G9, G10, G4 and G5 to make the inputs S and R of the shift register respectively low and high to cause zero's to be inserted into the input of the shift register under control of the 130 kHz. clock.

Also, the low Q output of the shift register SR in FIG. 44 extends through gate G11 to disable gate G12 from adding any more counts to counter CN4 of FIG. 40 until the next recirculated block count of one's appears at the output of the shift register SR.

Additional Block Counts

The above process continues until such time as the upper register (counters CN4, CN5, CN6 and CN7 of FIGS. 40 and 41) passes from its capacity count (9,999) to zero count (0000). This will cause use the carry flip-flop FF2 in FIG. 41 to change state (Q output goes from low to high—Q output goes from high to low) to stop the full block count processing and to initiate circuit functions for taking into account any partial block count remaining in shift register SR of FIG. 44.

Each block count is recirculated through the shift register while being serially added into the upper register and each full block count causes one count to be inserted into counter CN10 of FIG. 41. If counter CN10 should be driven to a count of 9 block counts and then driven to 0 in a 10th block count, the $\overline{Q}$ output of counter CN10 will pass one count into counter CN11. In this manner, counters CN11 and CN10 accumulate respective tens and units of full block counts.

End of Full Block Counting

When the upper register is driven from capacity count (9,999) to zero count (0000), the $\overline{Q}$ output in FIG. 41 of counter CN7 carries a low-to-high transition, which causes single-shot SS13 to toggle FF2 to its one state (Q high—$\overline{Q}$ low). This action of FF2 causes the following changes in the circuit:

1. the J and K inputs in FIG. 44 of the division flip-flop FF3 are changed to be respectively low and high on leads 441 and 442;

2. the J and K inputs in FIG. 44 of the remainder flip-flop FF4 are changed to be respectively high and low on leads 442 and 441;

3. the upper input to gate G11 in FIG. 44 is made high on lead 442 to cause the upper input to gate G12 to remain high;

4. the middle input of gate G4 in FIG. 44 is made high on lead 442 to cause the input R of shift register SR to remain high;

5. the upper input in FIG. 41 of gate G13 is made low on lead 441;

6. the middle inputs in FIG. 44 of gates G9 and G10 are made low on lead 441, to keep their outputs low; and, 7. the output of gate G5 in FIG. 44 remains low at the S input to shift register SR.

At the time the carry flip-flop FF2 in FIG. 41 changes state to Q high and $\overline{Q}$ low, there may be a partial block count of one's in the output end of the shift register SR in FIG. 44; if so, there will also be another partial block count of one's at the input to the shift register due to the previous recirculation. The partial block count of one's at the input end is the remainder since it represents the number of counts beyond the last full block count required to cause the upper register to exceed its capacity.

With inputs S and R of the shift register respectively low and high, the 130 kHz. clock will, through SS3 and gate G3, insert zero's into the input end following the remainder block count and will shift the contents toward the output. In the meantime gate G12 allows 130 kHz. clock pulses to continue to be added over lead 408 into the upper register continuously.

When the block of one's at the output of shift register SR ends (a zero enters the last cell), output Q of the shift register goes low and output $\overline{Q}$ goes high. The high $\overline{Q}$ output extends over lead 447 to single-shot SS5 of FIG. 44 and to single-shot SS4 of FIG. 41. Single-shot SS4 will produce a short high pulse but it is blocked by the disabled gate G13 (upper input low) in FIG. 41. Single-shot SS5 in FIG. 44, however, will cause a short high pulse at the CP input to the reminder flip-flop FF4 to cause FF4 to go to its one state (Q high—$\overline{Q}$ low) since its respective J and K inputs are high (lead 442) and low (lead 441).

130 kHz. clock pulses appear on the lower input to gate G16 in FIG. 44 from the output of I1; the upper input to gate G16 is held high over contact F1-15; the next-to-upper input to gate G16 is now high from the high Q output of FF4; and, the next-to-lower input to gate G16 is monitoring the Q output of shift register SR. When the Q output of shift register SR is low (zero in last cell) gate G16 provides a low output on lead 407 through FIG. 43 and into FIG. 40 to the lower input to gate G54 at the CP input of counter CN8 (FIG. 40) to keep the CP input low since the upper input to gate G54 is also low over lead 406 into FIG. 43 to the low output of gate G2. When the Q output in FIG. 44 of shift register SR goes high (a one enters the last cell), gate G16 will be enabled to pass high 130 kHz. clock pulses on its lower input.

When the remainder block count of one's in shift register SR of FIG. 44 has been shifted along (with zero's behind it) so that one's begin to appear in the last cell, the 130 kHz. clock pulses at the lower input of gate G16 pass to the output of gate G16, over lead 407, through FIG. 43 into FIG. 40, and through gate G54 to the CP input of counter CN8. As before, if counter CN8 is driven from 9 to 0, the parameters of the clock, etc., are chosen such that the block count remainder inserted into counters CN9 and CN8 (such as 30) represents a close approximation of the tenths and hundredths of a block count.

When the remainder block count in shift register SR of FIG. 44 has been counted into counters CN8 and CN9 of FIG. 40, a zero will appear in the last cell of the shift register to render its Q output low and its $\bar{Q}$ output high. No more counts will be added into the counters CN8 and CN9 of FIG. 40 since the low Q output of the shift register SR in FIG. 44 disables gate G16 in FIG. 44.

Transfer Operation

With the answer registered in the lower register of FIGS. 40 and 41—tens in counter CN11, units in counter CN10, tenths in counter CN9, and hundredths in counter CN8—the following events occur:

1. the shift register SR in FIG. 44 continues to clear itself by inserting zero's at its input and by shifting the contents;

2. no further count is added into the lower register; and, 3. gate G12 of FIG. 44 continues to add 130 kHz. clock pulses into the upper register of FIGS. 40 and 41 over lead 408.

When the upper register has been driven to a count of 0,999 (after having exceeded its capacity due to the integral number of block counts now registered in counters CN11 and CN10 of FIG. 41), the respective counters CN7, CN6, CN5 and CN4 of FIGS. 40 and 41 will contain respective settings of 0, 9, 9 and 9. The next 130 kHz. clock pulse added into counter CN4 of FIG. 40 will reset counters CN4, CN5 and CN6 to 0 and will set counter CN7 to 1 to cause its Q(A) output to go high. This high extends to the left input of gate G17, whose right input is high on lead 442 from the high Q output of FF2. The output of gate G17 will go high to activate single-shot SS6, which thereupon provides a short high pulse at its output on lead 443 into FIG. 44 and through gate G60 to the CP input to FF3. Flip-flop FF3 thereupon alters its state to Q low and $\bar{Q}$ high since its J and K inputs are respectively low (lead 441) and high (lead 442).

When the Q output of FF3 in FIG. 44 goes low, the upper input of gate G8 goes low to stop further 130 kHz. clock pulses from passing gate G8, thus to prevent further clock pulses from being added into the upper register.

When the $\bar{Q}$ output in FIG. 44 of FF3 goes high, this high extends over lead 436 into FIG. 43 to activate single-shot SS2. The short high pulse from SS2 extends over lead 432 into FIG. 40 and through gate G56 to the left input to all of the transfer gates G20 through G51 of FIGS. 40 and 41. This causes to be transferred from the lower register to the upper register the nine's complement of the full and fractional block count registration in the lower register. The decimal point lamp DECPT of FIG. 41 is lit, as previously discussed, and is physically located between readout NX2 of FIG. 41 and readout NX1 of FIG. 40. The readout circuits NX3, NX2 and NX1 of FIGS. 40 and 41 will decode the nine's complement in the 2421 binary code to the equivalent of the true decimal values of the tens, units and tenths of block counts to provide a visual display of the answer in percent break, such as 60.2 percent, etc.

The high transfer pulse on lead 402 in FIG. 41 is applied to the clear input CL of the carry flip-flop FF2 to reset it (Q low—$\bar{Q}$ high). This makes lead 441 high and lead 442 low in FIGS. 41 and 44.

In FIG. 43, the short high pulse from SS2 (the transfer pulse) is delayed some 10 microseconds in delay DEL2 and is then extended over contact F1-10 to lead 433 into FIG. 40, through gate G18, and over contact F1-8 to lead 403 into FIGS. 40, 41, 43 and 44. In FIG. 40, the high pulse on lead 403 extends through gate G57 to lead 404 to clear (to zero count) counters CN8, CN9, and CN10 of FIGS. 40 and 41. In FIG. 41, the high pulse on lead 403 extends through gate G58 to clear (to zero count) counter CN11 of FIG. 41. The high pulse on lead 403 in FIG. 44 is applied to the clear input CL of the remainder flip-flop FF4 to reset it (Q low—$\bar{Q}$ high).

Summary of End of Transfer Operation

From the above, the entire circuit (except for the display timer of FIG. 42—Q high and $\bar{Q}$ low—in its unstable 300 msec. timing interval) has been returned to a normalized condition as follows:

1. the lower register (counters CN8, CN9, CN10 and CN11 of FIGS. 40 and 41) is cleared;

2. the upper register (counters CN4, CN5, CN6 and CN7 of FIGS. 40 and 41) contains the %BK answer of the previous series of dial pulses in tens (CN7), units (CN6), tenths (CN5) and hundredths (CN4);

3. the lamp displays (NX3, NX2 and NX1 of FIGS. 40 and 41) show the percent break in lighted decimal numbers showing the tens (NX3), units (NX2) and tenths (NX1) of %BK;

4. the shift register SR of FIG. 44 is cleared;

5. counters CN2 and CN3 of FIG. 43 are reset to counts of 5;

6. counter CN1 of FIG. 42 is reset to a count of 9; and, 7. the flip-flops FF1 (FIG. 42), FF2 (FIG. 41), FF3 (FIG. 44) and FF4 (FIG. 44) are reset—Q outputs low and $\bar{Q}$ outputs high.

The switch S1 in FIG. 43 is still closed from the DIAL PULSE INPUT; but, the end of the dial pulses has occurred so that the output of switch S1 is the long low make at the end of the train of ten breaks (see FIG. 2).

At the time of the leading edge of the tenth high break interval (see FIG. 2) when the measurements were concluded and the dividing process was started, it will be recalled that the input flip-flop FF1 of FIG. 42 was cleared (Q to low and $\bar{Q}$ to high). The high $\bar{Q}$ output of FF1 set the display timer DSPTM of FIG. 42 into its unstable state (Q high—$\bar{Q}$ low) from which it returns to its stable state (Q low—$\bar{Q}$ high) after a timing period of about 300 msec. The dividing process is controlled, as above discussed, by the 130 kHz. clock in FIG. 44. Thus, one complete shifting of the contents of the shift register SR in FIG. 44 will take 128 clock pulses at 130 kHz., which is a little less than one millisecond to process one full block count. It will thus take less than 100 milliseconds to process the number of block counts measuring %BK. The remaining 200 msec., or so, of the 300 msec. time-out period of the display timer DSPTM of FIG. 42 is more than enough to allow all of the above-discussed normalizing operations to take place.

Display Timer Times Out

At the end of the 300 msec. time-out period of the display timer DSPTM in FIG. 42, the timer reverts to its stable state (Q low—$\bar{Q}$ high). This, in turn, rearranges the J and K inputs to the input flip-flop FF1 in FIG. 42 to respective high and low conditions, which thereupon arranges flip-flop FF1 to be responsive to the first high break of a new series of dial pulses when supplied in FIG. 43 by the DIAL PULSE INPUT.

The timeout of the timer DSPTM in FIG. 42 is the end of the automatic normalizing operation which adjusts the circuit in the same manner as did the manual normalizing, previously discussed, by the momentary operation in FIG. 42 of the CLEAR switch. Thus, if the circuit had been put into operation by the closing of switch S1 in FIG. 43 and by the supplying of dial pulses from the DIAL PULSE INPUT in FIG. 43, without a manual clearing operation, the circuit would perform in the same manner as discussed in detail above, except that the display (NX1, NX2 and NX3 of FIGS. 40 and 41) would have initially indicated some old answer at the very start.

The reason why the upper counter is allowed to advance to the count of a thousand (CN7=1, CN6=0, CN5=0, and CN4 =0) before ending the division process, from the low-to-high Q(A) output of counter CN7 in FIG. 41, is to make certain that the remainder information can be extracted from the shift register and that the shift register ends up in the cleared condition.

Measuring Dialing Speed

Switch F1 was operated and switch F3 was released for measuring %BK. In order to measure pulsing speed with the circuit, switch F3 must be operated and switch F1 must be released. Only five significant changes are made in the circuit for the speed mode:

1. lead 414 in FIG. 40 is connected through contact F3-7 to the output of gate G18 instead of to low ground through contact F1-7;

2. lead 403 in FIG. 40 is connected to low ground through contact F3-16 instead of to the output of gate G18 through contact F1-8;

3. lead 405 in FIG. 41 is connected through contact F3-13 to the output of gate G13 instead of to low ground through contact F1-14;

4. in FIG. 44, the lower input to gate G14 and the upper input to gate G16 are connected to low ground through contact F3-14 instead of to high potential through contact F1-15; and, 5. in FIG. 43, the lower input to gate G2 is disconnected (open contact F1-16) from the output of gate G1 and is connected to low ground through contact F3-15.

The speed mode of operation differs particularly from the %BK mode in the following manners:

1. the lower register (counters CN8, CN9, CN10 and CN11 of FIGS. 40 and 41) is set to a prescribed count of 9,000—CN11 (9), CN10 (0), CN9 (0) and CN8 (0);

2. no clock pulses are fed to the lower register as was the case for %BK; and, 3. the block count from the shift register SR in FIG. 44 is inserted into counter CN9 in FIG. 40 instead of into counter CN10 in FIG. 41 as in %BK.

In FIG. 40, as will be recalled, gate G18 produces a high output as a result of the clearing operation, manual or automatic. This high extends through contact F3-7 to lead 414 in FIGS. 40 and 41. In FIG. 40, the high on lead 414 extends through gate G57 to lead 404 to clear to zero count the counters CN8 and CN9 of FIG. 40 and the counter CN10 of FIG. 41. In FIG. 41, the high on lead 414 extends through gate G59 (left input low over contact F3-12) to the PS(−) inputs of counter CN11 to set it to a count of 9. The respective counters CN11, CN10, CN9 and CN8 are thus set to counts of 9, 0, 0 and 0.

In FIG. 40, the CP input to counter CN8 is held low from gate G54. The upper input to gate G54 is held low on lead 406 into FIG. 43 from the low output of gate G2, the bottom input to which is held low over contact F3-15. The lower input to gate G54 in FIG. 40 is held low on lead 407 through FIG. 43 into FIG. 44 from the low output of gate G16, the upper input to which is held low over contact F3-14. Thus, no 10 kHz. clock pulses are fed into the lower register as was the case for the %BK mode. The fixed registration of 9,000 in the lower register remains throughout the measuring phase of the speed mode.

In FIG. 44, the shift register SR accumulates 100 Hz. clock pulses from gate G3 and lead 446 during the nine full pulse periods as in the %BK mode.

In FIGS. 40 and 41, the 9,000 count in the lower register is transferred as the nine's complement (0,999) into the upper register at the leading edge of the tenth break, as in the %BK mode, by a pulse from single-shot SS1 in FIG. 40.

Also as a result of the leading edge of the tenth break, the division flip-flop FF3 is set (Q high—$\overline{Q}$ low), and the lower register is cleared, as in the %BK mode, by a delayed pulse from DEL1 in FIG. 40 on lead 444.

As in the %BK mode, the division phase amounts to serially adding the block count in the shift register SR of FIG. 44 into the upper register a number of times until the latter exceeds its capacity. Assume, for example, that a nominal pulsing speed of 10 pps is present: the first 9 pulse periods will consume 0.9 seconds which represents 90 counts into shift register SR from the 100 Hz. clock on lead 446 in FIG. 44. It will require 100 full block counts of 90 (a total of 9,000 counts) to drive the upper register from 0,999 to 9,999. Each block count, as in %BK, is manifested in FIG. 41 as a short high pulse from single-shot SS4 at the lower input to gate G13. Gate G13 passes this high pulse to its output onto lead 445. Lead 445 extends into FIG. 44 to the upper input to gate G14 whose lower input is held low by contact F3-14, thus to prevent the high pulse from passing through gate G14. In FIG. 41, the high pulse on lead 445 is extended through contact F3-13 to lead 405 into FIG. 40, through gate G55 and contact F3-6 to the CP input of counter CN9.

As the result of the 100 block counts, the upper register is driven to a count of 9,999 and the lower register is driven to a count of 0001—CN11(1), CN10(0), CN9(0) and CN8(0). One more pulse into the upper register will drive it to zero count (0000) to set the carry flip-flop FF2 in FIG. 41 to stop the division process. This one count will be the first one from the output of shift register SR in the 11th block count and will represent at the front of shift register SR a remainder of 1.

When the carry flip-flop FF2 of FIG. 41 is set by virtue of the upper register going from capacity count (9,999) to zero count (0000), the division process is finished and the remainder process ensues, as in %BK, with the visual displays NX3, NX2 and NX1 showing the three respective decimal digits of 1, 0 and 1 as the answer. With the decimal point lamp DECPT of FIG. 41 lit over contact F3-17 and physically located between NX2 (FIG. 41) and NX1 (FIG. 40), reading the display in the order of HX3—NX2—NX1, the answer appears as 10.1 pps.

When the display timer DSPTM of FIG. 42 times out, as in %BK, the entire circuit is normalized as before.

It is to be understood that the above-described arrangement is illustrative of the application of the principles of the invention. Numerous other arrangements may be devised by those skilled in the art without departing from the spirit and scope of the invention.

What is claimed is:

1. Circuitry for measuring the average time interval between alternate consecutive pairs of signals among an odd series of such signals in terms of a percentage of the average time period between consecutive odd signals comprising:

A. a first register;

B. a second register;

C. means controlled by alternate consecutive pairs of signals for causing the first register to contain a registration indicative of the sum of all time intervals between the signals of the alternate pairs;

D. means controlled by the first and last signals of the series for causing the second register to contain a registration indicative of the sum of all time periods between the first and last signals;

E. and, means controlled by the last signal of the series for dividing the registration in the first register by the registration in the second register.

2. Circuitry for measuring the average time interval between alternate consecutive pairs of signals among an odd series of such signals in terms of a percentage of the average time period between consecutive odd signals comprising:

A. a first register;

B. a second register;

C. a first source of pulses recurring at a constant frequency substantially greater than the recurrence frequency of consecutive signals of a pair;

D. means controlled by the first and last signals of the series for causing the second register to register a pulse count of the number of pulses from the first source occurring during the sum of all time periods between the first and last signals;

E. a second source of pulses recurring at a constant frequency an integral multiple of 10 times the recurrence frequency of pulses from the first source;

F. means controlled by alternate consecutive pairs of signals for causing the first register to register a pulse count of the number of pulses from the second source occurring during the sum of all time intervals between the signals of the alternate pairs;

G. and, means controlled by the last signal of the series for dividing the pulse count in the first register by the pulse count in the second register.

3. Circuitry for measuring the average time interval between alternate consecutive pairs of signals among an odd series of such signals in terms of a percentage of the average time period between consecutive odd signals comprising:

A. a first register comprising
   1. a primary pulse count register of a given count capacity
   2. and a secondary pulse count register of the same given count capacity;

B. a second register;

C. a first source of pulses recurring at a constant frequency substantially greater than the recurrence frequency of consecutive signals of a pair;

D. means controlled by the first and last signals of the series for causing the second register to register a pulse count of the number of pulses from the first source occurring during the sum of all time periods between the first and last signals;

E. a second source of pulses recurring at a constant frequency an integral multiple of 10 times the recurrence frequency of pulses from the first source;

F. means controlled by alternate consecutive pairs of signals
   1. for causing the primary register to count pulses from the second source occurring during the sum of all time intervals between the signals of the alternate pairs
   2. and for causing the secondary register to register therein the complement of the pulse count in the primary register;

G. means controlled by the last signal of the series for causing the pulse count in the second register to be repeatedly and cumulatively added to the pulse count in the secondary register;

H. and, means controlled by the adding means for indicating the number of additions required to cause the cumulative pulse count in the secondary register to exceed the capacity of the secondary register.

4. The invention defined in claim 3 wherein:

A. the second register comprises a serial pulse shift register having a plurality from first to last of pulse storage elements greater in number than the number of pulses from the first source occurring during the sum of all time periods between the first and last signals;

B. the means for causing the second register to register a pulse count comprises means controlled by each pulse from the first source
   1. for causing the pulse to be stored in the first element of the shift register
   2. and for causing each priorly stored pulse to be shifted to the element next succeeding the element priorly storing the pulse;

C. the adding means comprises
   1. a source of shift control pulses,
   2. means controlled by the last signal of the series for applying control pulses to the shift register to cause each stored pulse to shift to the next succeeding element in response to each shift control pulse,
   3. means for causing the first element to next succeed the last element so that the stored pulses recirculate through the shift register as long as shift control pulses are applied thereto,
   4. and means for causing each stored pulse shifted from the last element to the first element to be added to the pulse count in the secondary register;

D. and, the indicating means indicates the number of recirculations required to cause the cumulative pulse count in the secondary register to exceed the capacity thereof.

5. The invention defined in claim 4 wherein the indicating means comprises

A. means controlled by the secondary register for preventing further application of control pulses to the shift register when the cumulative pulse count in the secondary register exceeds the capacity thereof B. and means controlled by the adding means for counting the number of recirculations occurring during the application of control pulses to the shift register.

6. The invention defined in claim 5 further comprising means controlled by the preventing means when the cumulative pulse count in the secondary register exceeds the capacity thereof A. for detecting the number of pulses remaining in the shift register B. and for controlling the indicating means to indicate a fractional recirculation count represented by that remaining number of pulses.

7. Circuitry for measuring the average time interval between alternate consecutive pairs of signals among an odd series of such signals in terms of a percentage of the average time period between consecutive odd signals comprising:

A. a first source of pulses recurring at a constant frequency substantially greater than the recurrence frequency of consecutive signals of any pair in the series;

B. a second source of pulses recurring at a constant frequency an integral multiple of 10 times the recurrence frequency of pulses from the first source;

C. binary pulse counting means having a count capacity greater than the number of pulses from the second source occurring during the sum of all time intervals between the signals of alternate consecutive pairs of signals in the series;

D. a pulse shift register having a plurality of serially related storage elements greater in number than the number of pulses from the first source occurring during the sum of all time periods between the first and last signals in the series;

E. setting means controlled by alternate consecutive pairs of signals for causing the binary counting means to be set to a count equal to the nine's complement of the number of pulses from the second source occurring during the sum of all time intervals between the signals of alternate pairs;

F. storing means controlled by the first and last signals of the series for causing the shift register to store in consecutive storage elements the number of pulses from the first source occurring during the sum of all time periods between the first and last signals;

G. adding means controlled by the last signal of the series for causing the pulses stored in the shift register to repeatedly circulate through the shift register while being cumulatively added to the pulse count in the binary counting means;

H. means controlled by the binary counting means for preventing further circulation and adding when the cumulative pulse count in the binary counting means exceeds the capacity thereof;

I. and, means controlled by the adding means for indicating the number of circulations required to cause the cumulative pulse count in the binary counting means to exceed the capacity thereof.

8. The invention defined in claim 7 wherein:

A. the binary counting means comprises
   1. a primary binary counter having a plurality of binary counting stages
   2. and a secondary binary counter having a plurality of binary counting stages equal in number to the plurality of stages in the primary counter;

B. and, the setting means comprises
   1. means controlled by alternate consecutive pairs of signals for causing pulses from the second source to be counted in the primary counter 2. and means controlled by the primary counter for transferring to the secondary counter the nine's complement of the count in the primary counter.

9. The invention defined in claim 8 wherein:

A. the secondary counter is settable from capacity count to zero count upon the addition of a pulse;

B. and, the preventing means is controlled by the secondary counter for preventing further circulation and adding when the secondary counter is set from capacity count to zero count.

10. The invention defined in claim 9 wherein:

A. the adding means comprises 1. a source of shift pulses,
2. means controlled by the last signal of the series for applying shift pulses to the shift register,
3. means for causing pulses shifted from the last storage element to be stored in the first storage element,
4. and means for causing pulses shifted from the last storage element to be added to the pulse count in the secondary counter;

B. and, the preventing means prevents further application of shift pulses to the shift register when the secondary counter is set from capacity count to zero count.

11. The invention defined in claim 10 wherein the indicating means is controlled by pulses shifted from the last storage element for counting the number of times the pulse count in the shift register is circulated.

12. The invention defined in claim 11 wherein:

A. the means for causing pulses from the second source to be counted in the primary counter comprises a transmitting gate connected between the second source and the primary counter and controlled by alternate consecutive pairs of signals for allowing pulses to be transmitted from the second source to the primary register only during the time intervals between signals of the pairs;

B. and, the means for transferring to the secondary counter the nine's complement of the count in the primary register comprises a plurality of transfer gates connected between corresponding stages of the primary and secondary counters.

13. The invention defined in claim 12 wherein:

A. the means for applying shift pulses to the shift register comprises a shift gate connected between the source of shift pulses and the shift register and controlled by the last signal of the series for allowing shift pulses to be transmitted from the source of shift pulses to the shift register;

B. and, the preventing means causes the shift gate to prevent further transmission of shift pulses to the shift register when the secondary counter is set from capacity count to zero count.

14. The invention defined in claim 11 further comprising means controlled by the preventing means when the secondary counter is set from capacity count to zero count A. for detecting the number of pulses remaining in the shift register B. and for controlling the indicating means to indicate a fractional circulation count represented by that remaining number of pulses.

15. The invention defined in claim 11 wherein:

A. the means for transferring to the secondary counter the nine's complement of the count in the primary counter is controlled by the last signal of the series to transfer the then cumulative count in the primary counter and to clear the primary counter to zero count;

B. and, the indicating means comprises the cleared primary counter.

16. The invention defined in claim 15 further comprising means controlled by the preventing means when the secondary counter is set from capacity count to zero count A. for counting the number of pulses remaining in the shift register B. and for controlling the primary counter to indicate that remaining pulse count as a fractional circulation count.